US007874913B2

(12) United States Patent
Webb et al.

(10) Patent No.: US 7,874,913 B2
(45) Date of Patent: Jan. 25, 2011

(54) GAMING DEVICE HAVING A PRIMARY GAME SCHEME INVOLVING A SYMBOL GENERATOR AND SECONDARY AWARD WHEELS

(75) Inventors: Bayard S. Webb, Sparks, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/543,012

(22) Filed: Aug. 18, 2009

(65) Prior Publication Data

US 2009/0305771 A1 Dec. 10, 2009

Related U.S. Application Data

(60) Division of application No. 10/952,058, filed on Sep. 27, 2004, now Pat. No. 7,597,618, which is a continuation-in-part of application No. 10/715,005, filed on Nov. 17, 2003, now abandoned, which is a continuation of application No. 10/174,789, filed on Jun. 19, 2002, now Pat. No. 6,682,419, which is a continuation of application No. 09/689,495, filed on Oct. 12, 2000, now Pat. No. 6,461,241.

(51) Int. Cl.
*A63F 13/00* (2006.01)
*A63F 13/10* (2006.01)

(52) U.S. Cl. ............................ 463/20; 463/16; 463/31; 273/138.1; 273/139; 273/142 R; 273/142 B

(58) Field of Classification Search ............. 463/16–23, 463/30–32; 273/138.1, 139, 141 R, 142 R, 273/143 R, 142 B, 142 H, 142 HA, 145 R, 273/146, 268, 461; *A63F 13/00, 13/10*
See application file for complete search history.

(56) References Cited

U.S. PATENT DOCUMENTS

| | | | | |
|---|---|---|---|---|
| 4,448,419 | A | | 5/1984 | Telnaes |
| 4,560,161 | A | | 12/1985 | Hamano |
| 4,695,053 | A | | 9/1987 | Vazquez, Jr. et al. |
| 4,732,386 | A | * | 3/1988 | Rayfiel ........................ 463/20 |
| 4,775,155 | A | | 10/1988 | Lees |
| 4,874,173 | A | | 10/1989 | Kishishita |
| 5,205,555 | A | | 4/1993 | Hamano |
| 5,342,049 | A | | 8/1994 | Wichinsky et al. |
| 5,393,057 | A | | 2/1995 | Marnell, II |
| 5,411,271 | A | | 5/1995 | Mirando |
| 5,536,016 | A | | 7/1996 | Thompson |

(Continued)

FOREIGN PATENT DOCUMENTS

DE 8710757 11/1987

(Continued)

OTHER PUBLICATIONS

Bingo Game Brochure written by Casino Data System, published in 1998.

(Continued)

*Primary Examiner*—David L Lewis
*Assistant Examiner*—Arthur O. Hall
(74) *Attorney, Agent, or Firm*—K&L Gates LLP

(57) ABSTRACT

A gaming device with a primary game scheme including one or more symbol generators and a plurality of wheels where each wheel is associated with a different one of the symbol generators. When one or more of the symbol generators generates at least one predetermined symbol, the gaming device activates or spins the wheel associated with that symbol generator. The gaming device provides any awards associated with the activated wheels to a player.

18 Claims, 18 Drawing Sheets

U.S. PATENT DOCUMENTS

| | | | |
|---|---|---|---|
| 5,584,764 | A | 12/1996 | Inoue |
| 5,609,524 | A | 3/1997 | Inoue |
| 5,611,730 | A | 3/1997 | Weiss |
| 5,639,089 | A | 6/1997 | Matsumoto et al. |
| 5,641,730 | A | 6/1997 | Brown |
| 5,645,486 | A | 7/1997 | Nagao et al. |
| 5,722,891 | A | 3/1998 | Inoue |
| 5,755,619 | A | 5/1998 | Matsumoto et al. |
| 5,769,716 | A | 6/1998 | Saffari et al. |
| 5,775,692 | A | 7/1998 | Watts et al. |
| 5,788,573 | A | 8/1998 | Baerlocher et al. |
| 5,823,874 | A | 10/1998 | Adams |
| 5,833,537 | A | 11/1998 | Barrie |
| 5,848,932 | A | 12/1998 | Adams |
| 5,851,148 | A | 12/1998 | Brune et al. |
| 5,882,261 | A | 3/1999 | Adams |
| 5,911,418 | A | 6/1999 | Adams |
| 5,927,714 | A | 7/1999 | Kaplan |
| 5,935,002 | A | 8/1999 | Falciglia |
| 5,947,820 | A | 9/1999 | Morro et al. |
| 5,980,384 | A | 11/1999 | Barrie |
| 5,984,782 | A | 11/1999 | Inoue |
| 5,997,401 | A | 12/1999 | Crawford |
| 6,015,346 | A | 1/2000 | Bennett |
| 6,019,369 | A | 2/2000 | Nakagawa et al. |
| 6,033,307 | A | 3/2000 | Vancura |
| 6,059,289 | A | 5/2000 | Vancura |
| 6,059,658 | A | 5/2000 | Mangano et al. |
| 6,089,976 | A | 7/2000 | Schneider et al. |
| 6,089,978 | A | 7/2000 | Adams |
| 6,093,102 | A | 7/2000 | Bennett |
| 6,120,377 | A | 9/2000 | McGinnis, Sr. et al. |
| 6,126,542 | A | 10/2000 | Fier |
| 6,135,884 | A | 10/2000 | Hedrick et al. |
| 6,142,873 | A | 11/2000 | Weiss et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,190,255 | B1 | 2/2001 | Thomas et al. |
| 6,224,483 | B1 | 5/2001 | Mayeroff |
| 6,231,442 | B1 | 5/2001 | Mayeroff |
| 6,234,897 | B1 | 5/2001 | Frohm et al. |
| 6,261,177 | B1 | 7/2001 | Bennett |
| 6,270,412 | B1 | 8/2001 | Crawford et al. |
| 6,309,300 | B1 | 10/2001 | Glavich |
| 6,315,664 | B1 | 11/2001 | Baerlocher et al. |
| 6,319,123 | B1 | 11/2001 | Paludi |
| 6,322,309 | B1 | 11/2001 | Thomas et al. |
| 6,334,814 | B1 | 1/2002 | Adams |
| 6,336,863 | B1 | 1/2002 | Baerlocher et al. |
| 6,346,043 | B1 | 2/2002 | Colin et al. |
| 6,347,996 | B1 | 2/2002 | Gilmore et al. |
| 6,358,146 | B1 | 3/2002 | Adams |
| 6,364,766 | B1 | 4/2002 | Anderson et al. |
| 6,364,767 | B1 | 4/2002 | Brossard et al. |
| 6,375,187 | B1 | 4/2002 | Baerlocher et al. |
| 6,398,218 | B1 | 6/2002 | Vancura |
| 6,439,995 | B1 | 8/2002 | Hughs-Baird et al. |
| 6,443,837 | B1 | 9/2002 | Jaffe et al. |
| 6,461,241 | B1 | 10/2002 | Webb et al. |
| 6,464,582 | B1 | 10/2002 | Baerlocher et al. |
| 6,508,707 | B2 | 1/2003 | DeMar et al. |
| 6,547,242 | B1 | 4/2003 | Sugiyama et al. |
| 6,561,904 | B2 | 5/2003 | Locke et al. |
| 6,582,307 | B2 | 6/2003 | Webb |
| 6,598,877 | B1 | 7/2003 | Luciano et al. |
| 6,599,185 | B1 | 7/2003 | Kaminkow et al. |
| 6,602,135 | B1 | 8/2003 | Gerrard |
| 6,602,137 | B2 | 8/2003 | Kaminkow et al. |
| 6,607,437 | B2 | 8/2003 | Casey et al. |
| 6,607,438 | B2 | 8/2003 | Baerlocher et al. |
| 6,609,971 | B2 | 8/2003 | Vancura |
| 6,612,574 | B1 | 9/2003 | Cole et al. |
| 6,612,575 | B1 * | 9/2003 | Cole et al. ............... 273/138.1 |
| 6,682,419 | B2 | 1/2004 | Webb et al. |
| 6,682,420 | B2 | 1/2004 | Webb et al. |
| 6,685,563 | B1 | 2/2004 | Meekins et al. |
| 6,705,944 | B2 | 3/2004 | Luciano |
| 6,726,563 | B1 * | 4/2004 | Baerlocher et al. ............ 463/25 |
| 6,733,389 | B2 | 5/2004 | Webb et al. |
| 6,855,052 | B2 * | 2/2005 | Weiss et al. ................... 463/16 |
| 6,875,106 | B2 | 4/2005 | Weiss et al. |
| 6,905,407 | B2 | 6/2005 | Nordman |
| 6,981,917 | B2 | 1/2006 | Webb et al. |
| 7,169,046 | B2 | 1/2007 | Webb et al. |
| 2003/0078089 | A1 | 4/2003 | Gray et al. |
| 2003/0181239 | A1 | 9/2003 | Walker et al. |
| 2004/0002372 | A1 | 1/2004 | Rodgers et al. |

FOREIGN PATENT DOCUMENTS

| | | | |
|---|---|---|---|
| DE | 19600787 | | 5/1997 |
| DE | 19613455 | | 8/1997 |
| DE | 19936196 | | 1/2001 |
| EP | 0 449 433 | A2 | 2/1991 |
| GB | 2 137 392 | A | 10/1984 |
| GB | 2 201 821 | | 9/1988 |
| GB | 2 322 217 | | 8/1998 |
| WO | WO 00/12186 | | 3/2000 |

OTHER PUBLICATIONS

Full House Brochure written by Anchor Games, published in 2000.

Gold Fever Advertisement, written by Atronic International Casino, published in 1999.

Gold Fever Advertisement, written by Casino Data Systems, published in 1997.

High Roller Video Article, written by Strictly Slots, published in Mar. 2001.

Jackpot Bingo written by CDS.com, printed Apr. 12, 2001.

Jewel in the Crown Advertisement, written by IGT, published in 1999.

Jewel in the Crown Brochure written by Barcrest, Ltd, published date unknown.

Match Reel Game Bonus Description written by IGT, published date unknown.

Monte Carlo Advertisement written by Bally Gaming, published prior to Sep. 12, 2002.

Texas Tea, written by www.igt.com//games/new games/texastea, printed on Mar. 21, 2001.

Texas Tea Advertisement, written by IGT, published in 2000.

Texas Tea Article, written by Strictly Slots, published in Jul. 2000.

Wheel & Deal Brochure written by Anchor Games, Strictly Slots, published in Dec. 2001.

Wheel of Fortune Advertisement written by IGT, published in 1998.

Wheel of Fortune Advertisement written by IGT, published in 1999.

Wheel Poker Brochure written by Anchor Games/Bally Gaming, Strictly Slots, published prior to Sep. 12, 2002.

Non-Final Office Action dated Aug. 24, 2004 from U.S. Appl. No. 10/792,954, pp. 1-6.

Non-Final Office Action dated Oct. 4, 2004 from U.S. Appl. No. 10/715,005, pp. 1-4.

Non-Final Office Action dated Aug. 17, 2006 from U.S. Appl. No. 11/301,773, pp. 1-5.

Non-Final Office Action dated Aug. 8, 2008 from U.S. Appl. No. 11/627,271, pp. 1-5.

* cited by examiner

GAMING DEVICE HAVING A PRIMARY GAME SCHEME INVOLVING A SYMBOL GENERATOR AND SECONDARY AWARD WHEELS

PRIORITY CLAIM

This application is divisional of, claims priority to and the benefit of U.S. patent application Ser. No. 10/952,058, filed on Sep. 27, 2004, which is a continuation-in-part of, claims priority to and the benefit of U.S. patent application Ser. No. 10/715,005, filed Nov. 17, 2003, which is a continuation of, claims priority to and the benefit of U.S. patent application Ser. No. 10/174,789, filed Jun. 19, 2002, now U.S. Pat. No. 6,682,419, which is continuation of, claims priority to and the benefit of U.S. patent application Ser. No. 09/689,495, filed Oct. 12, 2000, now U.S. Pat. No. 6,461,241, the entire contents of which are incorporated herein.

CROSS-REFERENCE TO RELATED APPLICATIONS

This application is related to the following commonly-owned co-pending patent applications: "GAMING DEVICE HAVING A FIRST GAME SCHEME INVOLVING A SYMBOL GENERATOR, A SECOND GAME AND A FIRST GAME TERMINATOR," Ser. No. 11/627,271.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which has a primary game scheme which involves at least one symbol generator and at least one secondary game which is used to trigger one or more awards.

BACKGROUND OF THE INVENTION

Contemporary gaming devices such as slot machines include a primary game and one or more bonus rounds. The primary games typically enable a player to generate one or more symbols using a symbol generator. The traditional symbol generator is a set of reels, where each reel displays a plurality of symbols. If the player reaches a predetermined combination of symbols, the player wins a value. In addition, if the player reaches a bonus triggering event, the gaming device advances the player to a bonus round where the player can accumulate additional values. The traditional bonus triggering event occurs when the player reaches a predetermined combination of symbols on a plurality of reels.

The existing primary games provide players with values and bonus triggering events based upon symbols that a player reaches using a symbol generator. These gaming devices do not include secondary games which accompany the symbol generator, wherein the secondary games also provide the player with values, bonus triggering events or other awards.

To increase player enjoyment and excitement, it is desirable to provide players with new game schemes for gaming devices which include a symbol generator and one or more secondary games for providing players with awards such as values and bonus triggering events.

SUMMARY OF THE INVENTION

The present invention overcomes the above shortcomings by providing a gaming device having a primary game which includes one or more, but preferably one, symbol generator and one or more secondary games. A symbol generator can be any mechanism in physical or video form, any mathematical calculation or model, any computer program or any technique which generates one or more symbols. Preferably, the symbol generator is a set of rotating reels where each reel displays a set of symbols. However, a symbol generator can involve other concepts such as a rotating wheel divided into a plurality of areas with symbols on those areas, a set of dice, one or more coins or a physical or virtual container which mixes a plurality of symbols and generates one or more symbols.

A secondary game can be any activity which provides a player with the opportunity to gain an award. The term award, as used herein includes one or more values or an opportunity to gain one or more values. Such an opportunity can be provided by triggering a bonus round. Preferably, a secondary game requires the player to complete a plurality of steps before reaching a win condition. When the player reaches a win condition in the secondary game, the gaming device provides the player with an award. Some examples of the preferred secondary games which require step-by-step progression are: (a) games which require a player to align a predetermined number of markers on a grid in a particular pattern; (b) games which involve the player competing against the gaming device, incorporating concepts such as those used in tic-tac toe, chess or checkers; and (c) games involving races and chases where the race or chase is carried out in a step-by-step process.

In operation, when the symbol generator generates one or more predetermined symbols, the gaming device operates or plays one or more secondary games. The gaming device may do so by enabling the player to use an input device to play the secondary game or the gaming device may automatically play the secondary game. If the player reaches a win condition in the secondary game, the gaming device provides the player with an award.

In one embodiment, the symbol generator is a plurality of reels displaying a plurality of symbols, and each reel is associated with an independent secondary game. The secondary game involves a grid including a plurality of locations. When the player aligns a predetermined number of markers in a predetermined pattern on the grid, a win condition occurs. In operation, if a reel displays a predetermined symbol, the gaming device operates or plays the secondary game associated with that reel. The gaming device does so by displaying a marker at a particular location on the associated secondary game. Where the gaming device locates the marker can be predetermined or determined by the computer of the gaming device during the game. Preferably, the reel indicates where the marker will be located with a symbol which bears a message. Each time the reels spin, the process of generating a predetermined symbol and displaying a marker on the associated secondary game repeats itself until a win condition occurs. However, it should be appreciated that the symbols on a reel will not include a marker upon each spin of the reels.

In this embodiment, it is also preferable that each location on the grid of each secondary game is associated with a value.

When a marker is positioned on the location, the player gains the value associated with that location. It is also preferable that the gaming device uses a cross-game symbol in conjunction with displaying a marker on a secondary game. A cross-game symbol is any symbol which is used by or displayed on the symbol generator and which is also used by or displayed on the secondary games. Preferably, the cross-game symbol is the same as the marker. Here, each reel displays at least one cross-game symbol, and when the symbol generator generates one or more predetermined symbols, the gaming device moves the cross-game symbol from the reels to the secondary games associated with such reels.

The game scheme of the present invention adds one or more secondary games to the traditional symbol generator used in primary games. When the symbol generator generates one or more predetermined symbols, the gaming device operates or plays one or more secondary games. When a player reaches a win condition in a secondary game, the gaming device provides the player with one or more of a variety of awards. Preferably, the award is a credit, bonus value or the triggering of a bonus round where the player can accumulate additional bonus value or credits.

In an alternative embodiment, the gaming device includes a plurality of symbol generators, such as reels, and at least one wheel associated with each of the reels. The reels each include a plurality of symbols having at least one predetermined symbol or bonus symbol. When the predetermined symbol occurs on one or more of the reels, the gaming device activates or spins the wheel associated with that reel or reels. For example, the gaming device activates or spins the wheel associated with the first reel when the predetermined symbol occurs on the first reel. The gaming device activates the wheel associated with the first reel and the wheel associated with the second reel when the predetermined symbol occurs on the first reel and on the second reel. It should be appreciated that the gaming device may activate one, a plurality or all of the wheels if the predetermined symbol occurs on the reel or reels associated with the wheels.

In this alternative embodiment, each of the wheels includes a plurality of sections having a plurality of awards. A section indicator is associated with each of the wheels and indicates one of the sections on the wheels after that wheel has been activated in a spin. In one embodiment, the gaming device provides the sum of any awards indicated on the wheels in each spin. In another embodiment, the gaming device provides the product of any awards indicated on the wheels. In a further embodiment, the gaming device provides the largest award of any of the awards indicated on the wheels.

In one embodiment, the gaming device activates or spins one or more of the wheels independently associated with or linked with the reels when the predetermined symbol occurs on one or more of the reels. In one embodiment, when a plurality or all of the wheels are activated in a spin, the gaming device simultaneously activates the wheels. In this embodiment, the wheels are each activated at the same time and indicate awards at the same time.

In another embodiment, the gaming device sequentially activates the wheels when a plurality or all of the reels are activated in a spin. In this embodiment, the first reel is activated, then the second reel is activated and so on. In another embodiment, the reels are activated in a random order. It should be appreciated that the reels may be activated in a random order, a predetermined order or in any suitable order.

In a further embodiment, the activation or spinning of the wheels overlap each other. For example, the first wheel is activated. As the first wheel is slowing down or about to stop spinning, the gaming device activates the second wheel or any other suitable wheel. Thus, the activation or spinning of the wheels overlaps each other. It should be appreciated that two or more of the wheels may be activated or spinning at the same time. It should also be appreciated that the overlapping of the activation or spinning of the wheels may include any suitable number of the wheels which spin in any suitable order.

In another alternative embodiment, a wheel such as a mechanical wheel is independently associated with or linked with one of a plurality of reels. The wheel includes a plurality of sections which each have at least one outcome such as an award. A plurality of section indicators are positioned adjacent to the wheel. Each section indicator indicates one of the sections of the wheel. In this embodiment, each of the section indicators are associated with one of the reels. When a predetermined symbol such as a bonus symbol appears on one or more of the reels, the gaming device activates the section indicator associated with the reel or reels which indicate the bonus symbol. The gaming device then provides the award associated with the sections indicated by the activated section indicators in the play of the game. In this embodiment, one, a plurality of all of the section indicators may be activated in a play of the game. Thus, the section indicators are each independently linked with the reels and activatable to enable a player to receive one or more awards in a play of the game.

In another alternative embodiment, a wager made by a player determines which of the wheels or section indicators are activated in a play of the game. In this embodiment, the player places or wagers a designated wager amount to activate one of the wheels or section indicators, a plurality of the wheels or section indicators or all of the wheels or sections indicators in a play of the game. For example, if the player wagers three credits, the gaming device activates the first wheel or section indicator associated with the first reel in a play of the game when the predetermined symbol occurs on the first reel in that play of the game. If a predetermined symbol occurs on the second or third reels in the play of the game, the gaming device does not activate the second or third wheels or section indicators associated with the second and third reels. Therefore, the player increases their wager in the play of the game to increase the chances of obtaining more awards in the play of the game.

In this alternative embodiment, the player's wager determines the probability of obtaining one or more of the predetermined symbols associated with the reels in a play of the game. In one example, each reel includes thirty-two symbols where one of the symbols on each reel is the predetermined symbol. If the player wager's three credits in a play of the game as described above, the probability of obtaining or indicating the predetermined symbol on the first reel is ($\frac{1}{32}$) or 3.125%. If the player wager's four credits in a play of the game, the probability of obtaining or indicating the predetermined symbol on the first reel or the second reel in that play of the game increases to [($\frac{1}{32}$)+($\frac{1}{32}$)] or 6.25%. If the player wager's five credits or the maximum number of credits in a play of the game, the probability of obtaining or indicating the predetermined symbol on any of the three reels is [($\frac{1}{32}$)+($\frac{1}{32}$)+($\frac{1}{32}$)] or 9.375%. Any suitable number of credits may be wagered by the player and any suitable probability of obtaining or indicating the predetermined symbol on one or more of the reels may be associated with the number of credits wagered by the player.

In another alternative embodiment, the player's wager determines the average payout provided to the player in the play of the game. In this embodiment, the player wagers a larger wager amount or more credits to increase the average payout provided to the player in the play of the game. For example, the player wagers three credits to obtain an average payout of fifty credits in the play of the game. The player wagers four credits to obtain an average payout of sixty credits in the play of the game. The player wagers five credits or the maximum wager amount to obtain an average payout of seventy credits in the play of the game. It should be appreciated that the average payout may increase or decrease based on the players wager in the play of the game.

In a further alternative embodiment, the gaming device includes a plurality of wheels and a plurality of symbol generators. Each of the wheels includes a plurality of sections having outcomes. Also, each of the wheels are independently linked with one of the symbol generators. One or more of the wheels are activated when the predetermined symbol is generated by the symbol generator linked with the wheel or wheels. In a play of the game, the processor activates each of the wheels linked with a symbol generator which generated the predetermined symbol. The processor provides a total outcome such as an award to a player based at least in part on any outcomes generated by the activated wheels.

It is therefore an advantage of the present invention to provide a gaming device having a game scheme involving a symbol generator and secondary award triggering games.

It is another advantage of the present invention to provide a gaming device that includes a plurality of reels and at least one wheel associated with each of the reels.

It is a further advantage of the present invention to provide a gaming device that includes a plurality of reels and at least one wheel having a plurality of activatable section indicators each associated with one of the reels.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
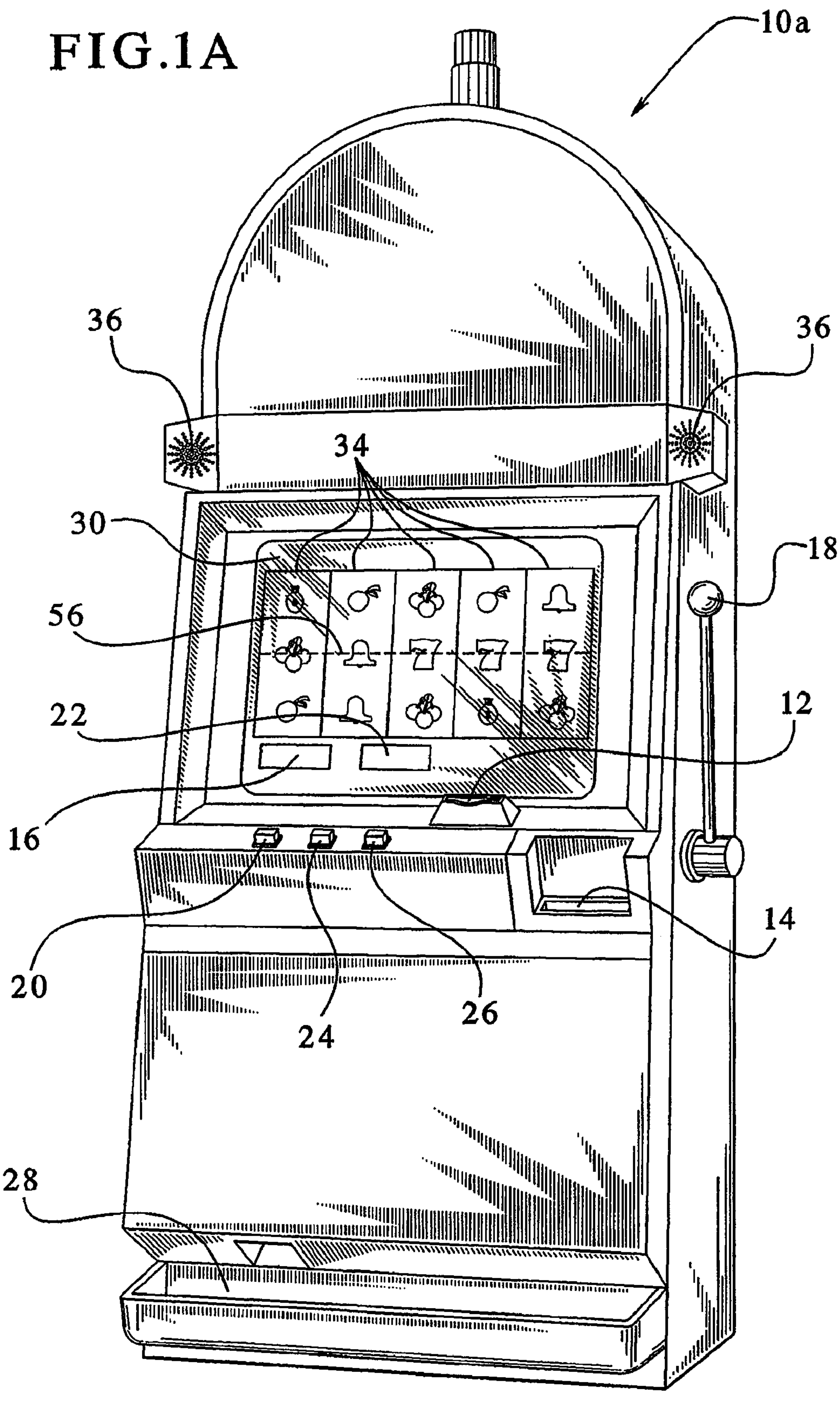
FIG. 1A is a perspective view of one embodiment of the gaming device of the present invention.
Figure 1B:
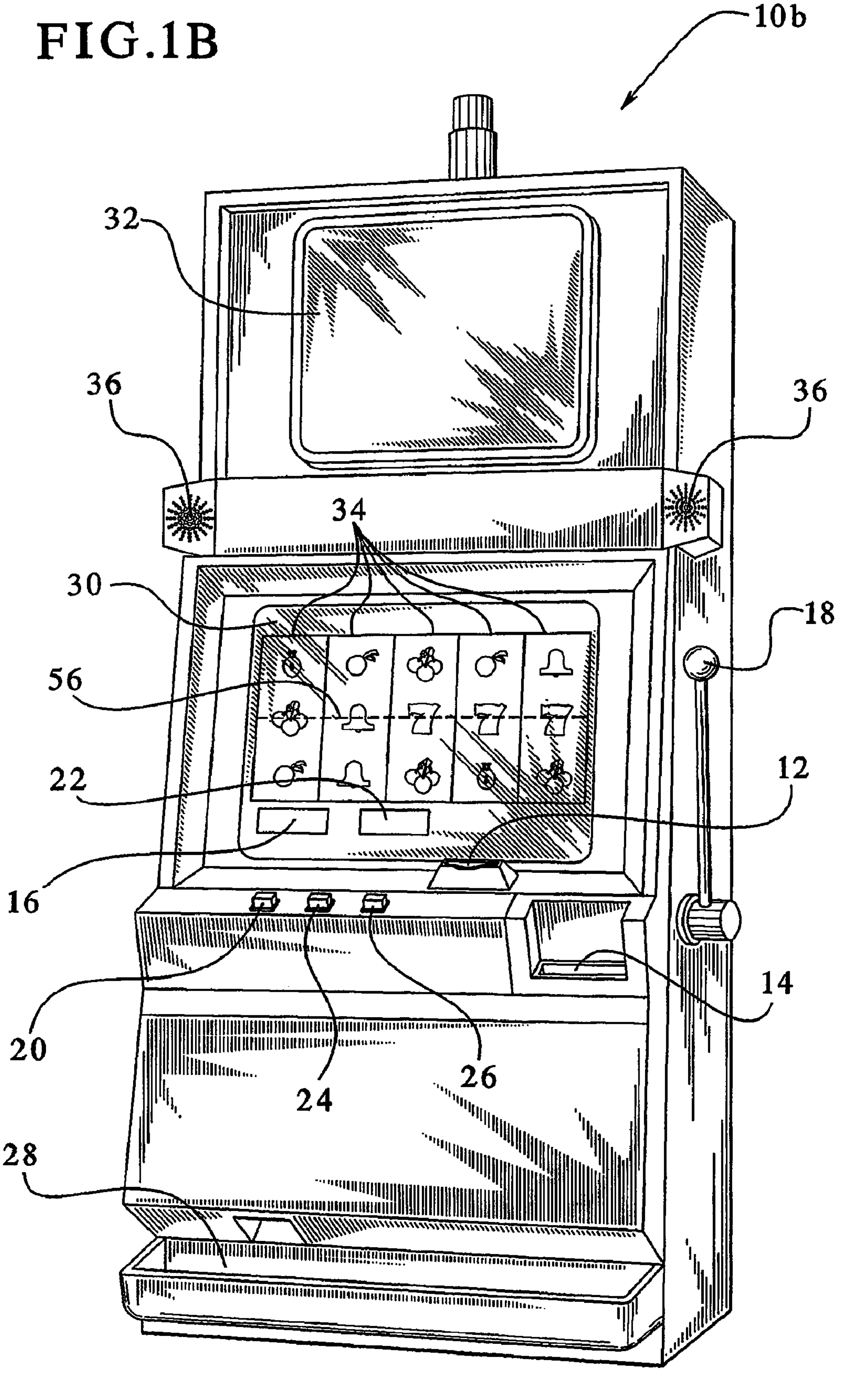
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
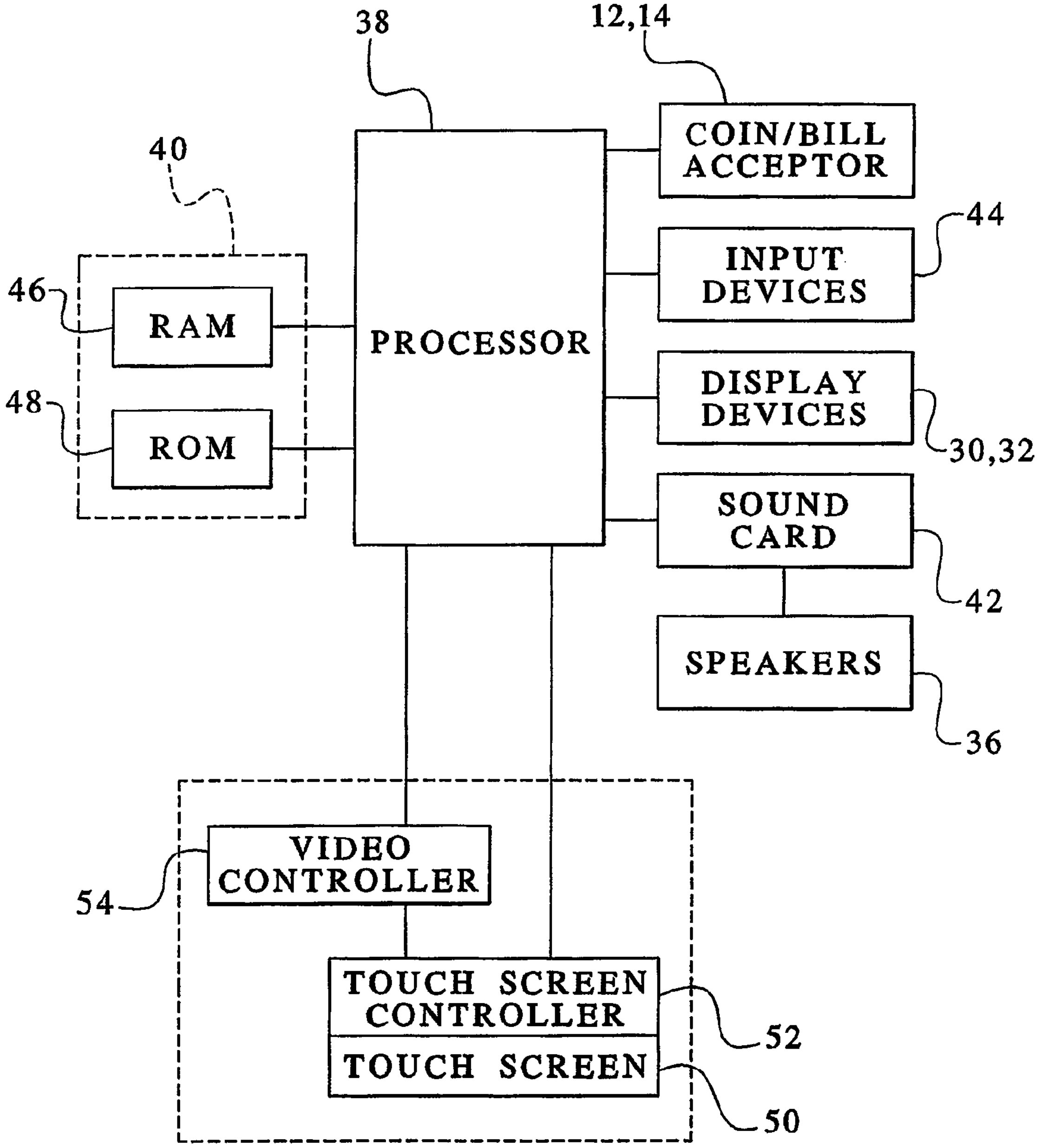
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Game Scheme

The game scheme of the present invention includes one or more symbol generators 100, preferably one, in a primary game and one or more secondary games 102. The preferable symbol generator 100 (shown in FIGS. 6, 7 and 8) is a set of video reels 34. However, it should be appreciated that the present invention can include any type of symbol generator 100. Similarly, the present invention can include any type of secondary game 102. Preferably, the secondary game 102 requires the player to complete a predetermined plurality of steps before achieving a win condition in the secondary game 102.

Figure 3:
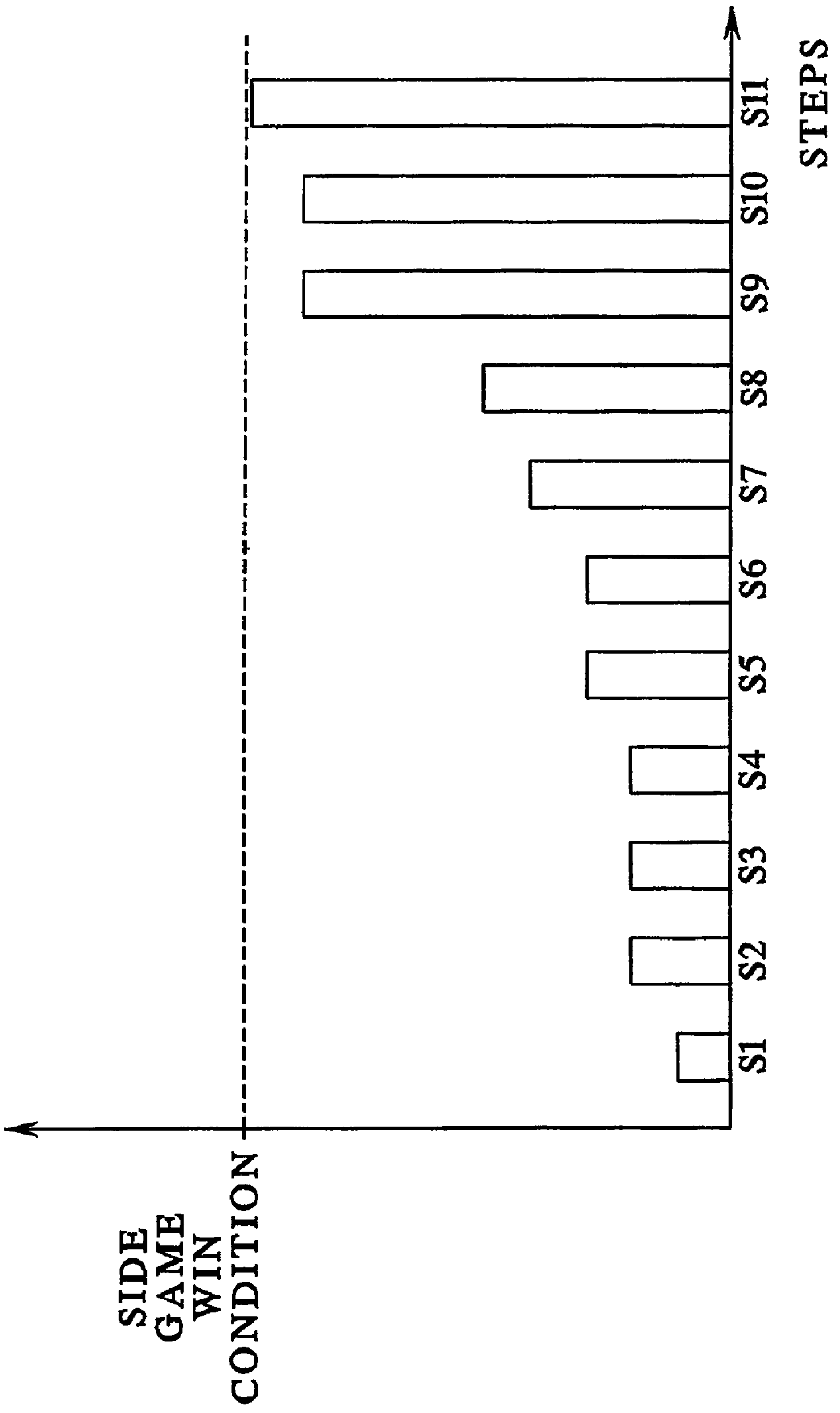
FIG. 3 is a bar graph illustrating a plurality of steps taken to reach a secondary game win condition in one embodiment of the present invention.

As illustrated in FIG. 3, one preferred secondary game 102 could require a player to complete eleven steps before achieving a win condition. The steps are indicated by the notation, S1 through S11. This example is included merely for illustrative purposes and any secondary game 102 can require any number of steps to be taken. This type of step-by-step secondary game 102 preferably incorporates one or more concepts of the following types of games: (a) games requiring a player to align a predetermined number of markers in a predetermined pattern on a grid, such as bingo; (b) tic-tac-toe; (c) chess; (d) checkers; (e) games where the player competes against the gaming device, such as race games or chase games; and (f) any other game where the player is unable to achieve a win condition in one step.

Figure 4A:
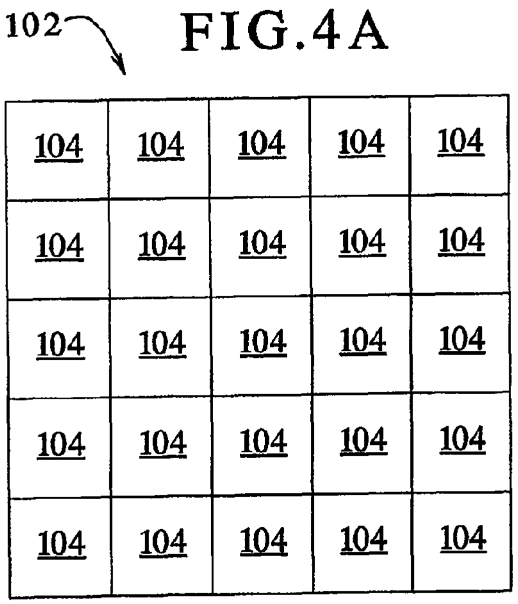
FIGS. 4A and 4B are top plan views of a secondary game in one embodiment of the present invention.
Figure 4B:
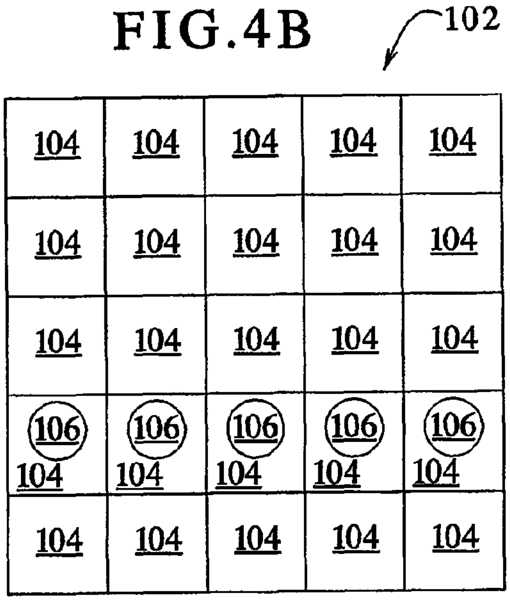

Two such step-by-step secondary games 102 are shown in FIGS. 4A, 4B, 5A, 5B and 5C. In FIGS. 4A and 4B, the secondary game 102 involves a plurality of locations 104 arranged in a grid. The object of the game is to position a complete row or column of markers 106 on the grid. In the example shown in FIG. 4A, the secondary game 102 initiates with no markers 106 being displayed on any of the locations 104. With each step, the gaming device positions a marker 106 on a location 104. Where the gaming device locates a marker 106 can be predetermined by the gaming device or determined by the gaming device during the operation of the secondary game 102. In the latter case, the gaming device can determine locations for the marker 106 randomly or by using any predetermined mathematical calculation. When the gaming device establishes a complete row or column of markers 106, a win condition occurs. In the example shown in FIG. 4B, the gaming device established a complete row of markers 106 in the second to last row of the grid of secondary game 102. This event established a win condition.

Figure 5A:
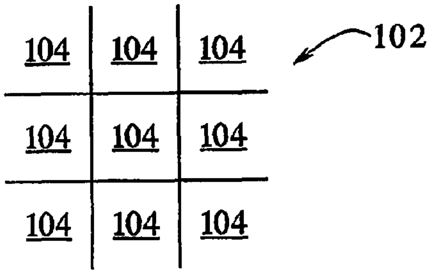
FIGS. 5A and 5B and 5C are top plan views of another secondary game in one embodiment of the present invention.
Figure 5B:
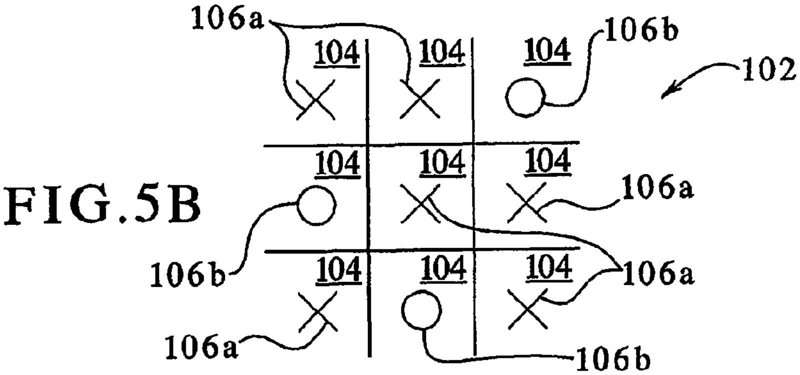
Figure 5C:
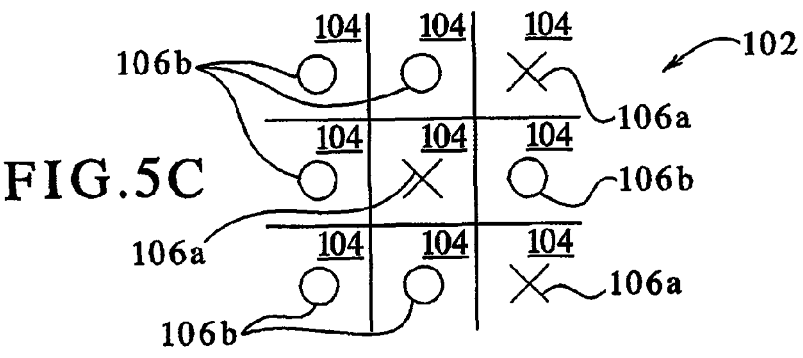

FIGS. 5A through 5C illustrate a secondary game 102 which involves the game tic-tac-toe. In this secondary game 102, the player competes against the gaming device. If the player establishes a line of three markers 106*a* on three locations 104, a win condition occurs. If the gaming device establishes a line of three markers 106*b* on three locations 104, the secondary game 102 preferably clears all markers from the secondary game 102 and restarts the game. This type of secondary game 102 operates in steps by a player using an input device to display a marker 106*a* followed by the computer of the gaming device displaying a marker 106*b*. In FIG. 5A, the secondary game is shown at the beginning of the game with no markers 106. FIG. 5B shows the end of a game, where the player reached a win condition by establishing a diagonal line of markers 106*a*. FIG. 5C shows a point in the game which precedes the game being restarted. It should be appreciated that the game scheme of the present invention can include secondary games 102 which would not require steps and secondary games 102 which do require steps. For example, a secondary game could be a type of symbol generator in and of itself.

Figure 6:
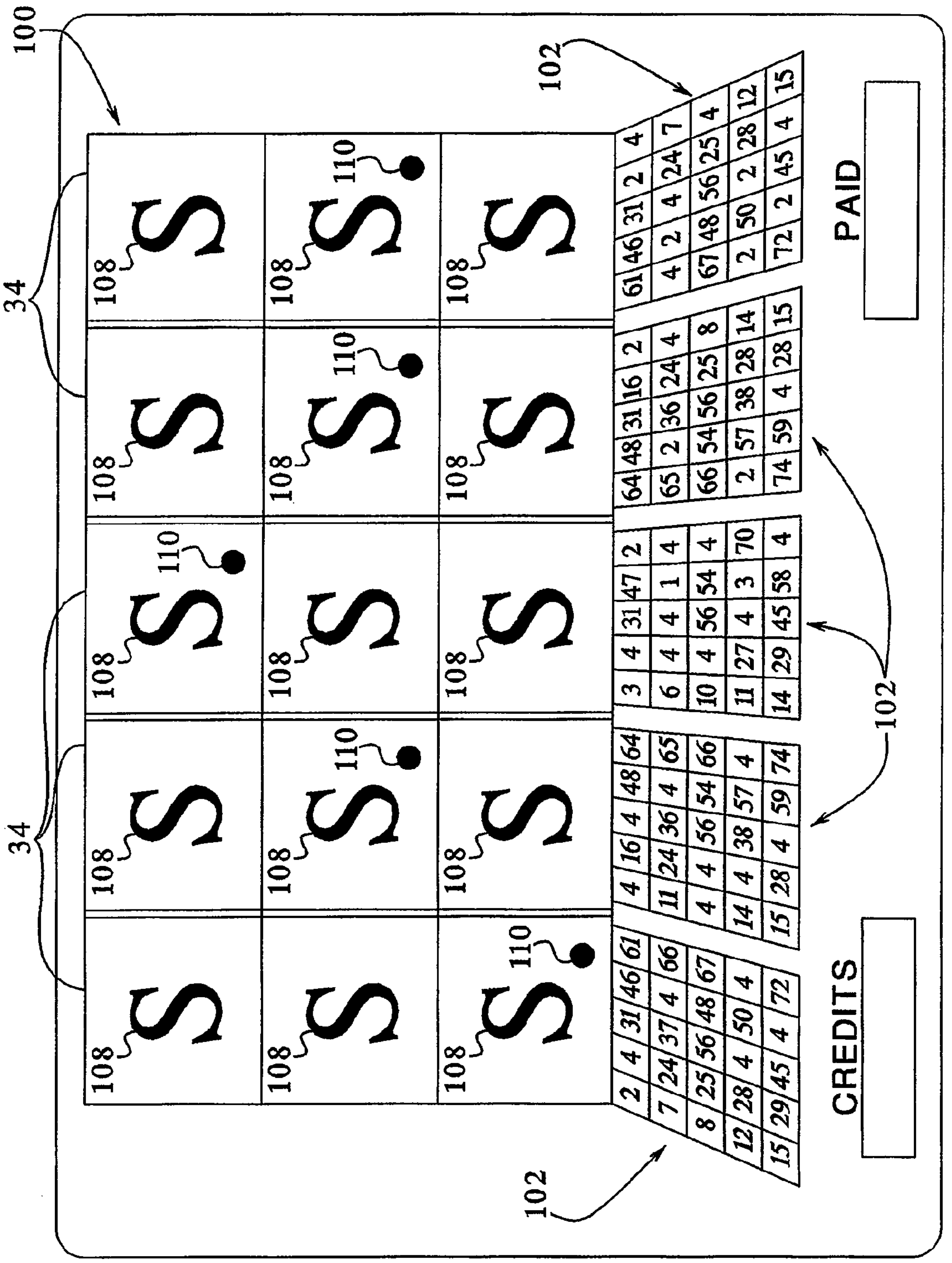
FIG. 6 is a top plan view of the initiation of a primary game in one embodiment of the present invention.

FIG. 6 illustrates a preferred embodiment of the present invention which includes the preferred primary game of the present invention and step-by-step secondary games 102. Here, the symbol generator 100 is a set of five reels 34. Each reel 34 displays a plurality of reel symbols 108 identified in FIG. 6 as the capital letter S. When the player activates an input device, such as play button 20, the reels 34 rotate. When the reels 34 stop rotating, if one or more reels 34 display a predetermined symbol 108, the gaming device operates or plays the secondary games 102, each of which is associated with a reel 34.

Figure 7:
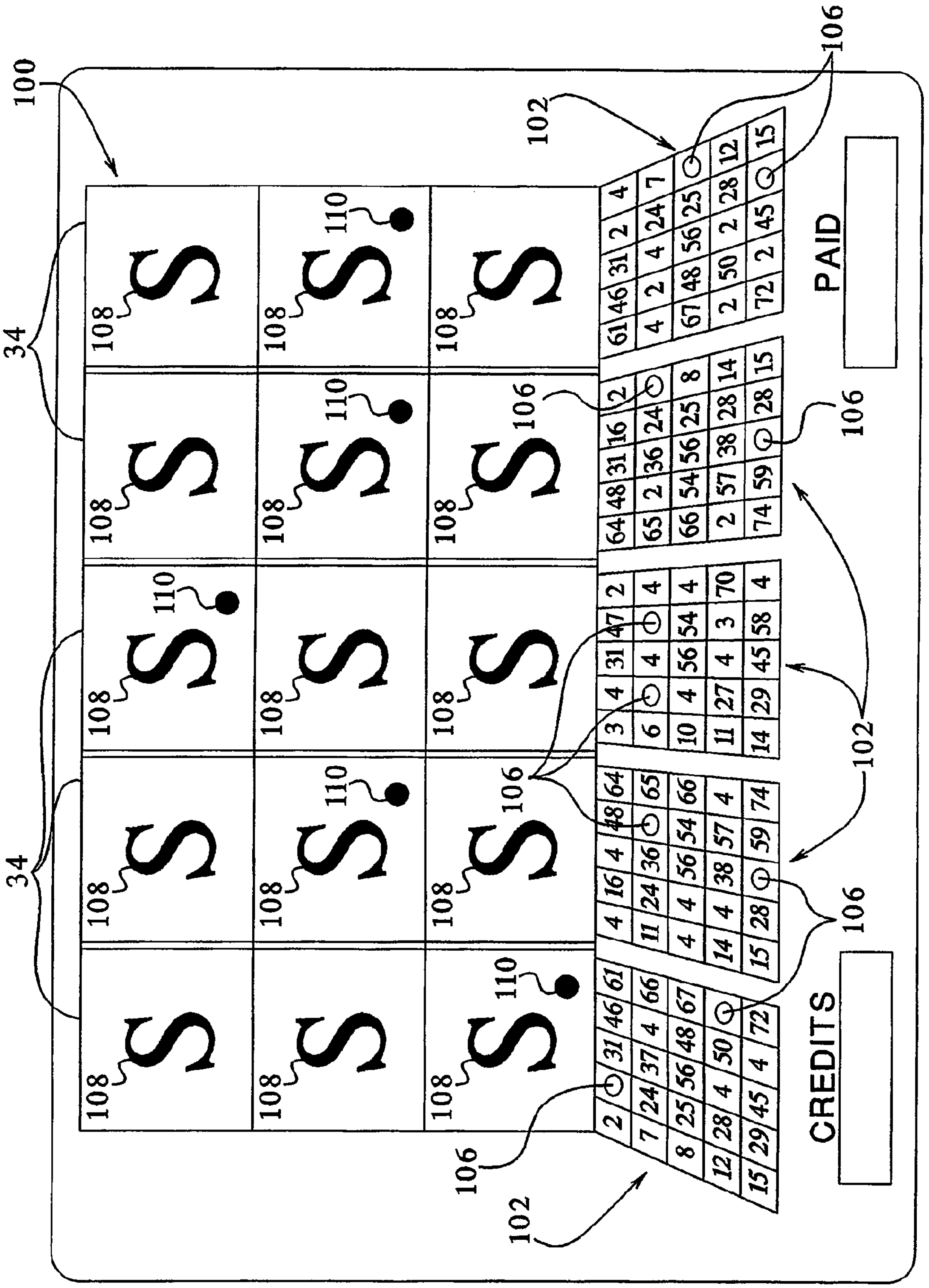
FIG. 7 is a top plan view of a primary game in progress in one embodiment of the present invention.
Figure 8:
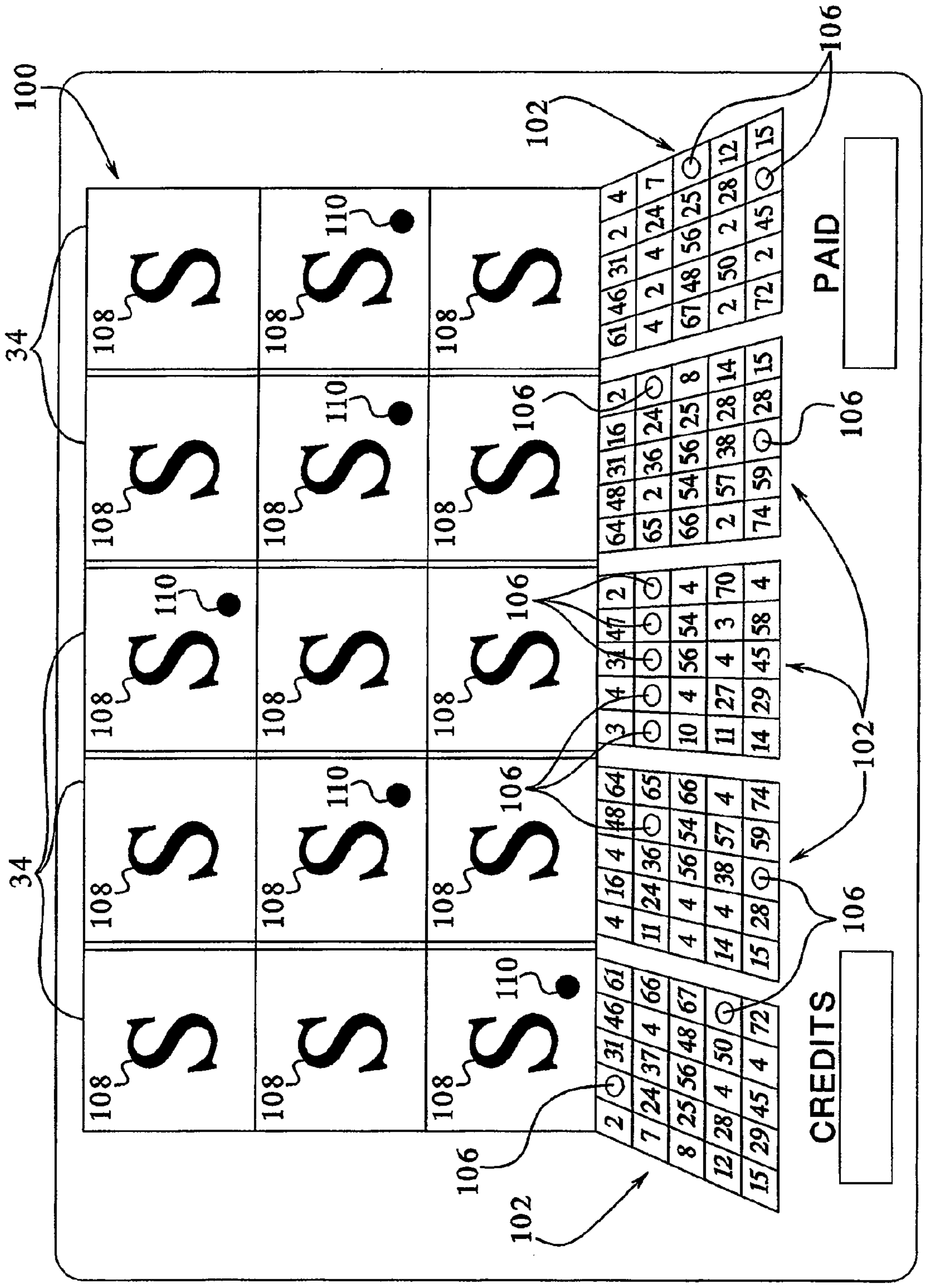
FIG. 8 is a top plan view of a secondary game win condition in a primary game in one embodiment of the present invention.

The secondary games 102 shown in FIG. 6 generally operate in the same manner of the secondary game 102 illustrated in FIG. 4. However, here the locations of the secondary games 102 are identified by and are associated with numerals as shown in FIGS. 6 through 8. In addition, when the player reaches a predetermined reel symbol 108 on any one reel 34, the gaming device displays a cross-game symbol 110 on that reel 34 and moves the cross-game symbol 110 from the reel 34 to the secondary game 102 associated with that reel 34. Furthermore, in FIG. 7, the cross-game symbol 110 bears a numeric message which indicates the numeral of the location on the grid where the marker 106 will be positioned. In this preferred embodiment, the cross-game symbol 110 is the same as marker 106. Therefore, the gaming device moves the cross-game symbols 110 from the reels 34 to the locations on the secondary games 102. There, the cross-game symbol 110 functions as a marker 106. It should be appreciated that the present invention can be adapted to enable the player to gain value associated with a location when a marker is displayed at a location.

Initially, it is preferable that in this preferred embodiment the primary game begins with no markers 106 being displayed at any of the secondary games 102, as shown in FIG. 6. However, the present invention can be adapted so that the primary game begins with one or more markers 106 being displayed at one or more of the secondary games 102. In operation, the gaming device causes reels 34 to spin. On each spin the secondary game associated with each reel may or may not progress. As each reel 34 displays predetermined reel symbols 108, the gaming device displays cross-game symbols 110. The cross-game symbols indicate where the marker 106 will be located in the associated secondary game by displaying a numeral momentarily. Then the gaming device moves the cross-game symbols 110 from the reels 34 to the associated secondary games 102 where the cross-game symbols function as markers 106. The present invention can be adapted so that when a marker 106 is located at a location on a secondary game 102, the gaming device provides the player with the value associated with that location.

In time, one or more secondary games 102 accumulate a plurality of markers 106 as shown in FIG. 7. It should be appreciated that, when a reel displays a predetermined reel symbol 108, the gaming device can display more than one marker 106 at any one secondary game 102. In FIG. 8, secondary game 102 associated with the middle reel 34 displays a complete row of markers 106. In this example, when a player achieves this complete row, the secondary game 102 provides the player with an award. Preferably, the award is the triggering of a bonus round where the player can accumulate additional value. The secondary games can clear and restart themselves when any predetermined event or events occur.

The game scheme of the present invention provides gaming devices with secondary games which accompany traditional symbol generators in primary games. When a symbol generator generates one or more predetermined symbols, the gaming device operates or plays one or more secondary games. Preferably, the symbol generator is a plurality of reels and each reel is associated with an independent secondary game. Furthermore, it is preferable that secondary games require a player to complete multiple steps before reaching a win condition in the secondary games. When a win condition occurs, the secondary game provides the player with an award. Preferably, this award is a bonus value, a credit or the triggering of a bonus round.

Secondary Wheels

Figure 9:
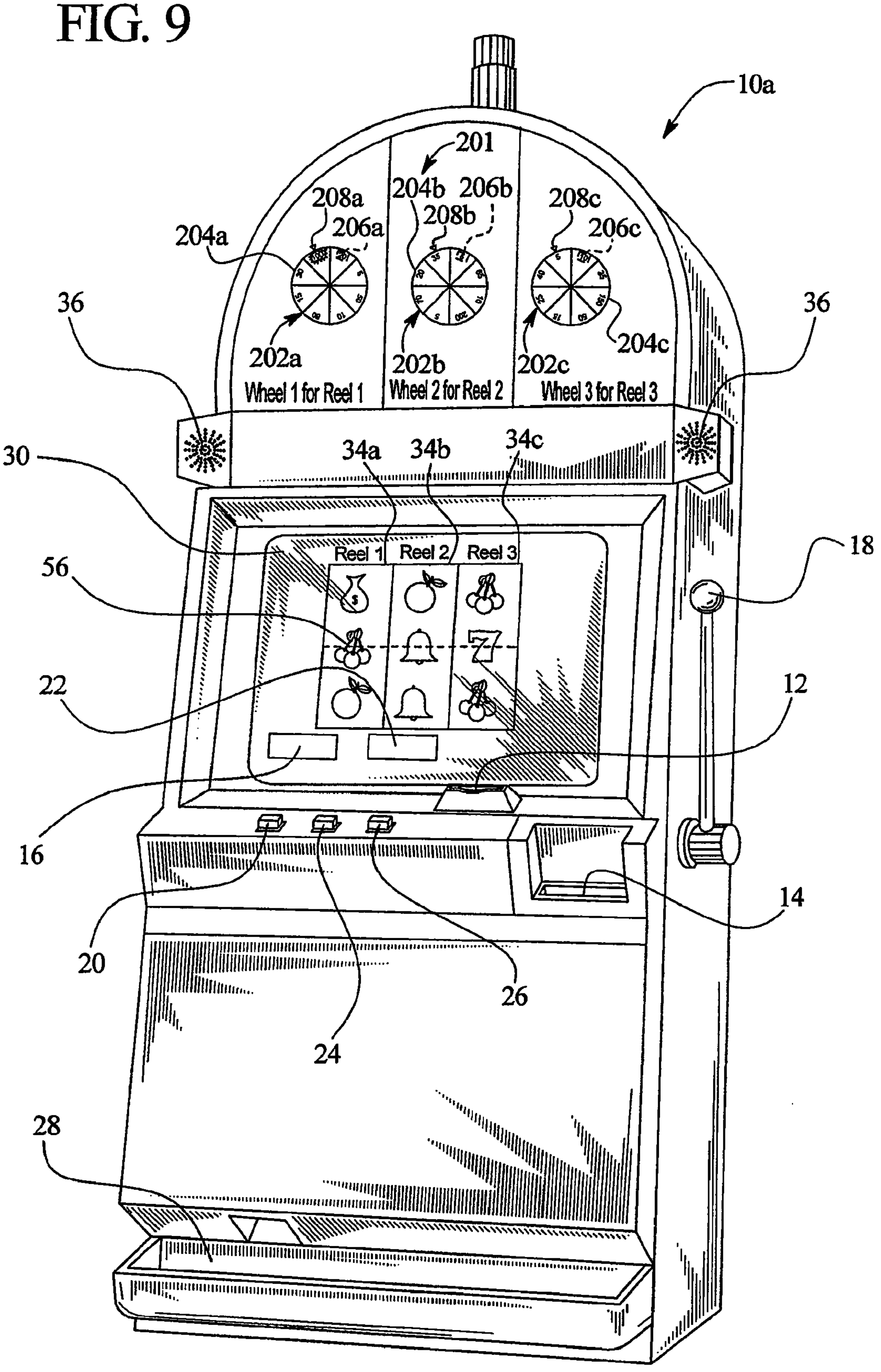
FIG. 9 is a perspective view of an alternative embodiment of the gaming device of the present invention.

Referring now to FIG. 9, in one alternative embodiment, the gaming device includes a plurality of reels, such as reels 34*a*, 34*b* and 34*c* displayed on display device 30, and a plurality of wheels, such as wheels 202*a*, 202*b* and 202*c* displayed by display device 201, where each of the wheels is associated with one of the reels. It should be appreciated that the reels 34 and the wheels 202 may be displayed by different display devices or by the same display device. In this embodiment, each of the wheels are independently associated with or linked with a different one of the reels 34. For example, wheel 202*a* (i.e., Wheel 1) is associated or linked with the first reel 34*a*. Wheel 202*b* (i.e., Wheel 2) is associated or linked with the second reel 34*b*. Wheel 202*c* (i.e., Wheel 3) is associated or linked with the third reel 34*c*. It should be appreciated that the reels may be mechanical reels or video reels. In an alternative embodiment, one or more wheels may be associated with each of the reels or a plurality of the reels.

The wheels 202*a*, 202*b* and 202*c* each include a plurality of sections, such as sections 204*a*, 204*b* and 204*c*, respectively. In one embodiment, the sections include outcomes such as awards 206*a*, 206*b* and 206*c*. It should be appreciated that section may include awards, values, modifiers, free activations of the reels, free activations of the wheels or any suitable outcome.

A section indicator is associated with each of the wheels. For example, section indicator 208*a* is associated with wheel 202*a*; section indicator 208*b* is associated with wheel 202*b*; and section indicator 208*c* is associated with wheel 202*c*. The section indicators in this embodiment are generally shaped as arrows. It should be appreciated that the section indicators may be any suitable size or shape as desired by the game implementor.

In this alternative embodiment, the gaming device enables a player to activate or spin the reels 34 to indicate symbols on the reels after the player has made a wager such as a number of credits. In a play of the game, the gaming device or player activates or spins the reels to indicate symbols on the reels. The gaming device then provides any outcomes such as awards associated with any winning combinations of symbols occurring on the reels to the player. If a predetermined symbol, such as a bonus symbol or other designated symbol, occurs on one or more of the reels, the gaming device activates or spins the wheel or wheels 202 associated with the reels 34 that indicate the predetermined symbol. For example in FIG. 9, if a predetermined symbol occurs on reel 34*a* in a spin, the gaming device activates wheel one or wheel 202*a* which is associated with reel one or reel 34*a*. If a predetermined symbol occurs on reels 34*a* and 34*b*, the gaming device activates wheels 202*a* and 202*b*. If a predetermined symbol occurs on reels 34*a*, 34*b* and 34*c*, the gaming device activates wheels 202*a*, 202*b* and 202*c*.

When the activated wheel or wheels stops spinning, the section indicator 208 associated or linked with the wheel or wheels indicates one of the sections on the activated wheel or wheels. The gaming device provides the outcome or award associated with any indicated sections on the wheels to the player for that spin. For example, if the predetermined symbol is indicated on reel 34*c*, the gaming device activates wheel 202*c*. Section indicator 208*c*, which is associated with wheel 202*c*, indicates one of the sections of wheel 202*c*. The indicated section includes an award of five as illustrated in FIG. 9. Therefore, the gaming device provides an award of five to the player. The award of five is added to any other awards provided to the player based on the symbol combinations indicated on the reels 34. Then, the total award for the spin is added to the player's total award for the game.

In one embodiment, when two or more of the wheels are activated, the gaming device provides the sum of the awards associated with any indicated sections indicated on the activated wheels to the player. In another embodiment, the gaming device provides the product of the awards associated with any indicated sections on the activated wheels to the player. In a further embodiment, the gaming device provides the largest award of the all of the awards associated with any indicated sections on the activated wheels to the player. It should be appreciated that any suitable award or combination of awards may be provided to the player based on the sections indicated on one or more activated wheels.

As described above, a player may receive one or more awards associated with the symbols indicated on the reels and also one or more awards associated with the activated wheels in each spin. The number of awards and specifically, the additional awards provided by the activated wheels, provides more awards to a player in a game and therefore increases the player's excitement and enjoyment of the game.

Figure 10:
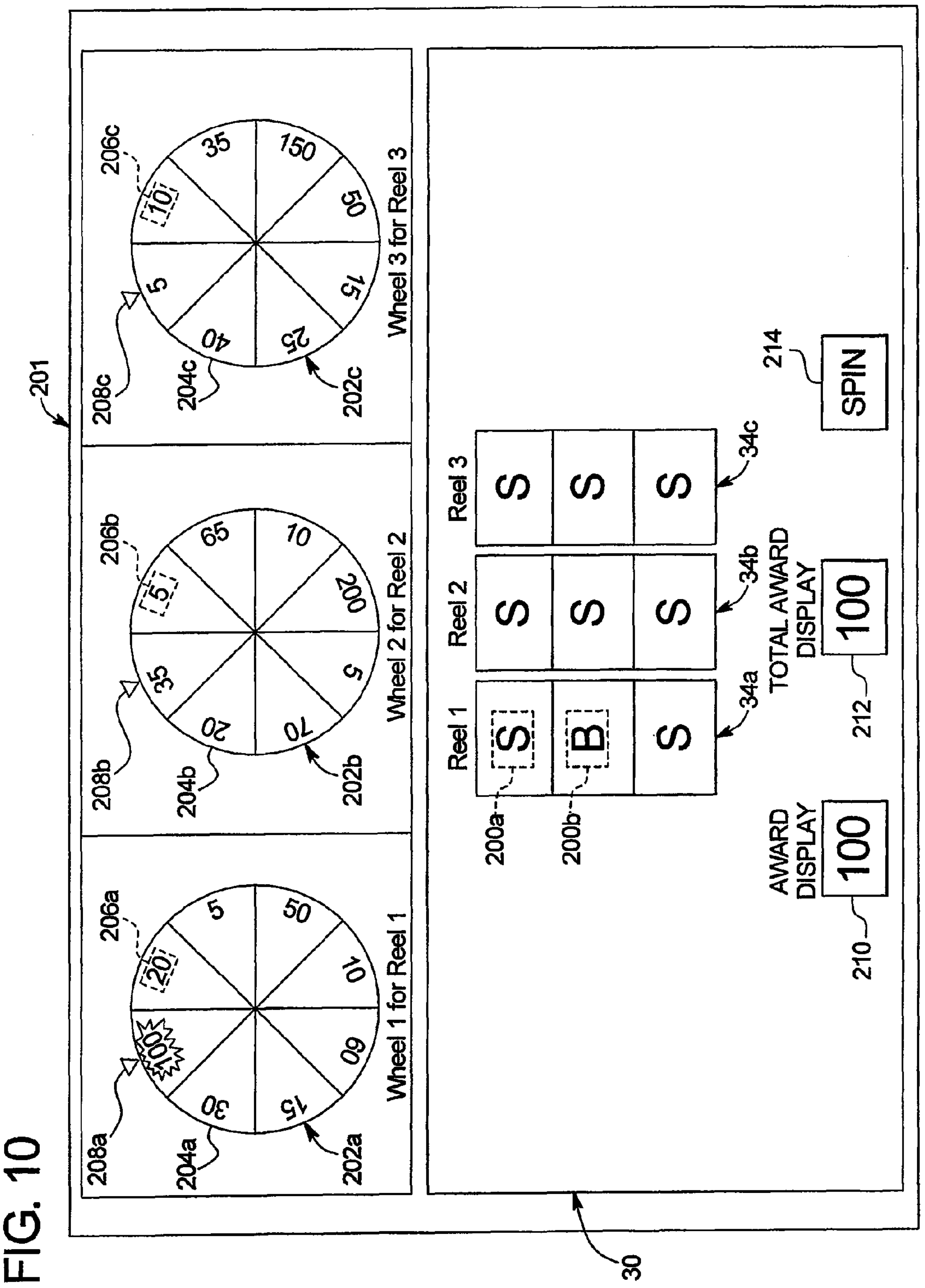
FIG. 10 is an enlarged elevation view of one of the display devices of FIGS. 1A and 1B illustrating the gaming device including three reels and a wheel associated with each of the reels where the first wheel is activated in the game.
Figure 11:
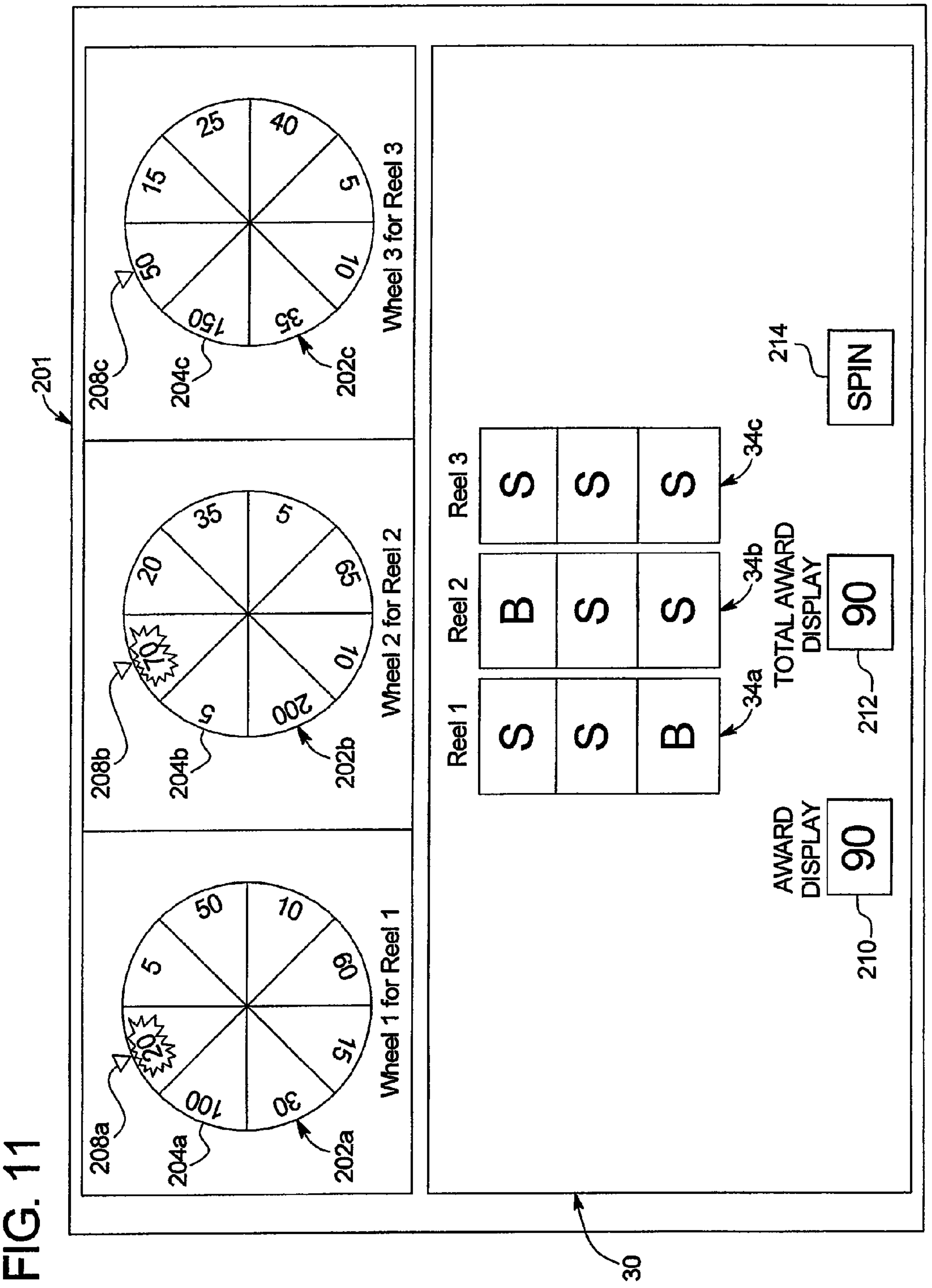
FIG. 11 is an enlarged elevation view of one of the display devices of FIGS. 1A and 1B illustrating the gaming device including three reels and a wheel associated with each of the reels where two of the wheels are activated in the game.
Figure 12:
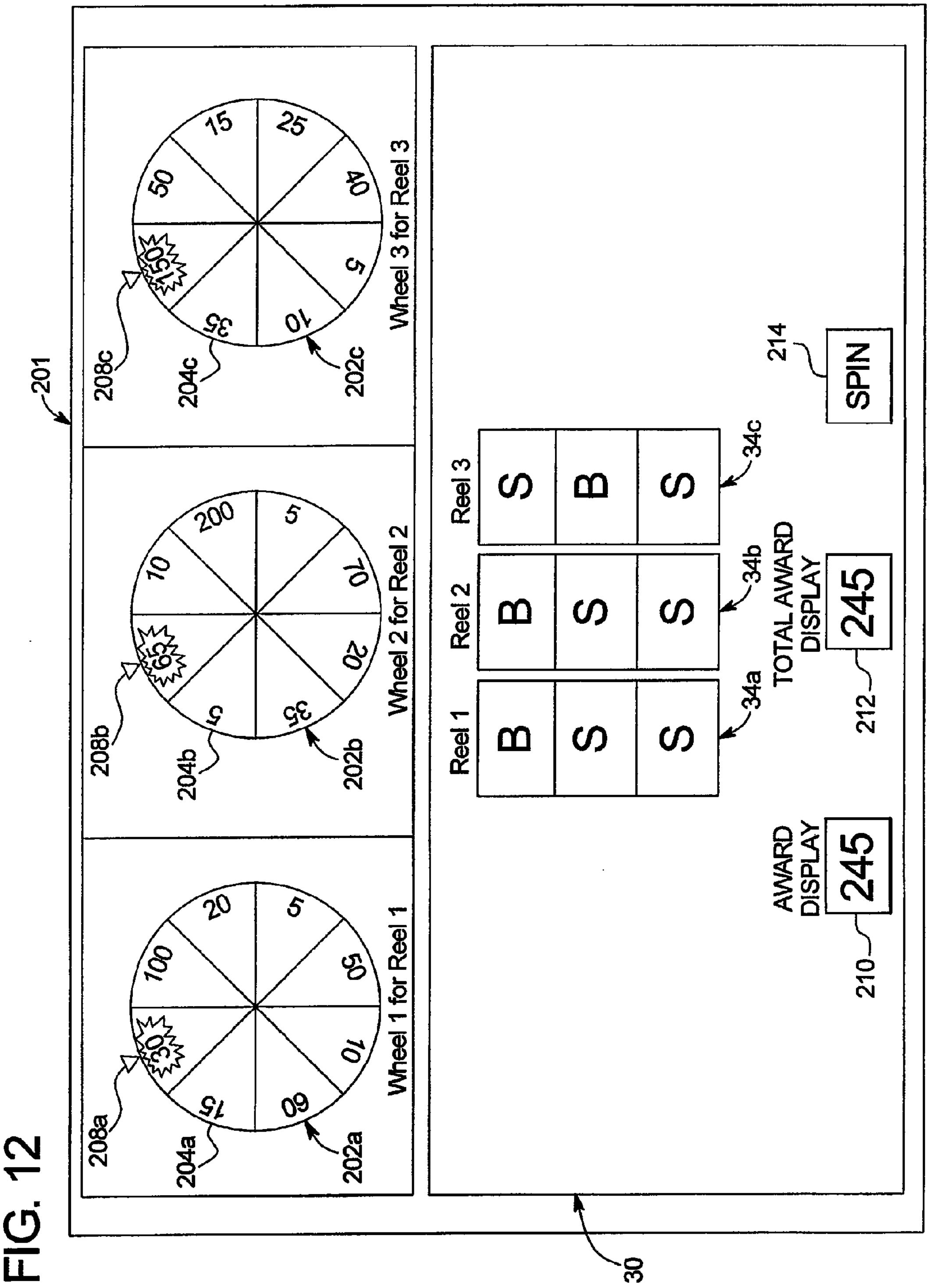
FIG. 12 is an enlarged elevation view of one of the display devices of FIGS. 1A and 1B illustrating a gaming device including three reels and a wheel associated with each of the wheels where all of the wheels are activated in the game.

Referring now to FIGS. 10 to 12, one example of the embodiment of FIG. 9 is illustrated. In this example, the gaming device includes three reels, 34*a*, 34*b* and 34*c*, each having a plurality of symbols "S" indicated by the numeral 200*a*, which are displayed on display device 30. It should be appreciated that the symbols 200*a* may be any characters, images, letters, numbers or other suitable symbols. Each of the reels 34*a*, 34*b* and 34*c* also includes at least one predetermined symbol or designated symbol such as a bonus symbol "B" indicated by numeral 200*b*. The predetermined symbol or bonus symbol 200*b* activates the wheel 202 associated with the reel 34 when the predetermined symbol or bonus symbol occurs on the reel in a spin without activating the other wheels 204*b* or 204*c*. In this example, the wheels 202 are displayed on a separate display device 201.

The gaming device also includes an award display 210, which indicates the award provided to the player in a spin; a total award display 212, which indicates the total award accumulated by the player in the game; and a spin or activation button or input 214 which enables a player to activate or spin the reels in a play of the game.

Referring to FIG. 10, in a play of the game the player activates or spins the reels 34*a*, 34*b* and 34*c*. The reels stop spinning to indicate symbols. Reel 34*a* indicates a predetermined symbol or bonus symbol 200*b* represented by the letter "B." Reels 34*b* and 34*c* do not indicate any predetermined symbols or bonus symbols. Therefore, the first wheel 202*a*, which is associated with reel 34*a*, is activated by the gaming device. Wheels 202*b* and 202*c* are not activated in this spin because these wheels are associated with reels 34*b* and 34*c*, respectively, which do not indicate any predetermined symbols or bonus symbols 200*b*.

In this example, the gaming device activates wheel 202*a*. It should be appreciated that the gaming device may activate the wheels or the gaming device may enable the player to activate the wheels by activating or pressing the spin button 214. After wheel 202*a* stops spinning, section indicator 208*a* indicates a section 204, including an award of one hundred. Therefore, the award of one hundred is transferred to the award display 210. The gaming device also adds the award of one hundred to the player's total award of zero to give the player a total award of one hundred as indicated by the total award display 212.

Referring now to FIG. 11, in another play of the game, the player spins the reels 34 again. The player activates or spins the reels 34*a*, 34*b* and 34*c* for a second time in the game by pressing or activating the spin button 214. When the reels stop spinning, reel 34*a* indicates a predetermined symbol or bonus symbol. Reel 34*b* also indicates a predetermined symbol or bonus symbol. Reel 34*c* does not indicate any predetermined symbols or bonus symbols. Therefore, the gaming device activates the first wheel 202*a* and the second wheel 202*b* associated with reels 34*a* and 34*b*, respectively. When the wheels 202*a* and 202*b* stop spinning, section indicators 208*a* and 208*b* indicate awards of twenty and seventy, respectively. In this example, the gaming device sums the awards associated with the indicated sections on wheels 202*a* and 202*b*, and provides the sum of these awards to the player. The awards of twenty and seventy are added together to provide an award of ninety to the player. The player did not receive any awards associated with the symbol combinations indicated on the reels 34*a*, 34*b* and 34*c*. Therefore, the gaming device transfers the award of ninety to the award display 210 to indicate the award provided to the player in this spin. The award of ninety is added to the player's total award to give the player a total award of ninety as indicated by the total award display 212.

Referring now to FIG. 12, in a play of the game, the player activates reels 34*a*, 34*b* and 34*c* by activating or pressing the spin button 214. After the reels stop spinning, reel 34*a* indicates a predetermined or bonus symbol, reel 34*b* indicates a predetermined or bonus symbol, and reel 34*c* also indicates a predetermined or bonus symbol. Therefore, in this spin, the gaming device activates all of the wheels 202*a*, 202*b* and 202*c*. In this example, the gaming device simultaneously activates all three wheels. It should be appreciated that the gaming device may simultaneously activate the wheels, sequentially activate wheels or activate the wheels so that the spinning of two or more of the wheels overlaps or spin the wheels in any suitable order. When the wheels stop spinning, section indicator 208*a* indicates an award of thirty, section indicator 208*b* indicates an award of sixty-five and section indicator 208*c* indicates an award of one hundred fifty. The gaming device sums these awards to provide a total award for this spin of two hundred forty-five as indicated by the award display 210. The total award of two hundred forty-five is added to the player's previous total award of zero. The player now has a total award of two hundred forty-five as indicated by the total award display 212.

As described above, the gaming device enables the player to activate a set of symbol generators, such as the reels 34, to indicate symbols in a game, such as primary game. If the symbol generators or reels indicate predetermined or bonus symbols on one or more of the reels, the gaming device activates a wheel or wheels associated with the symbol generator or reel including the bonus symbols. The gaming device then provides an award or awards to the player based on the wheels activated in that spin, if any. Associating a wheel including awards with each of the reels enables the player to obtain more awards in each of the spins in a game. This increases the excitement and enjoyment of the game because the player may receive multiple awards in one or more spins in a game.

Figure 13:
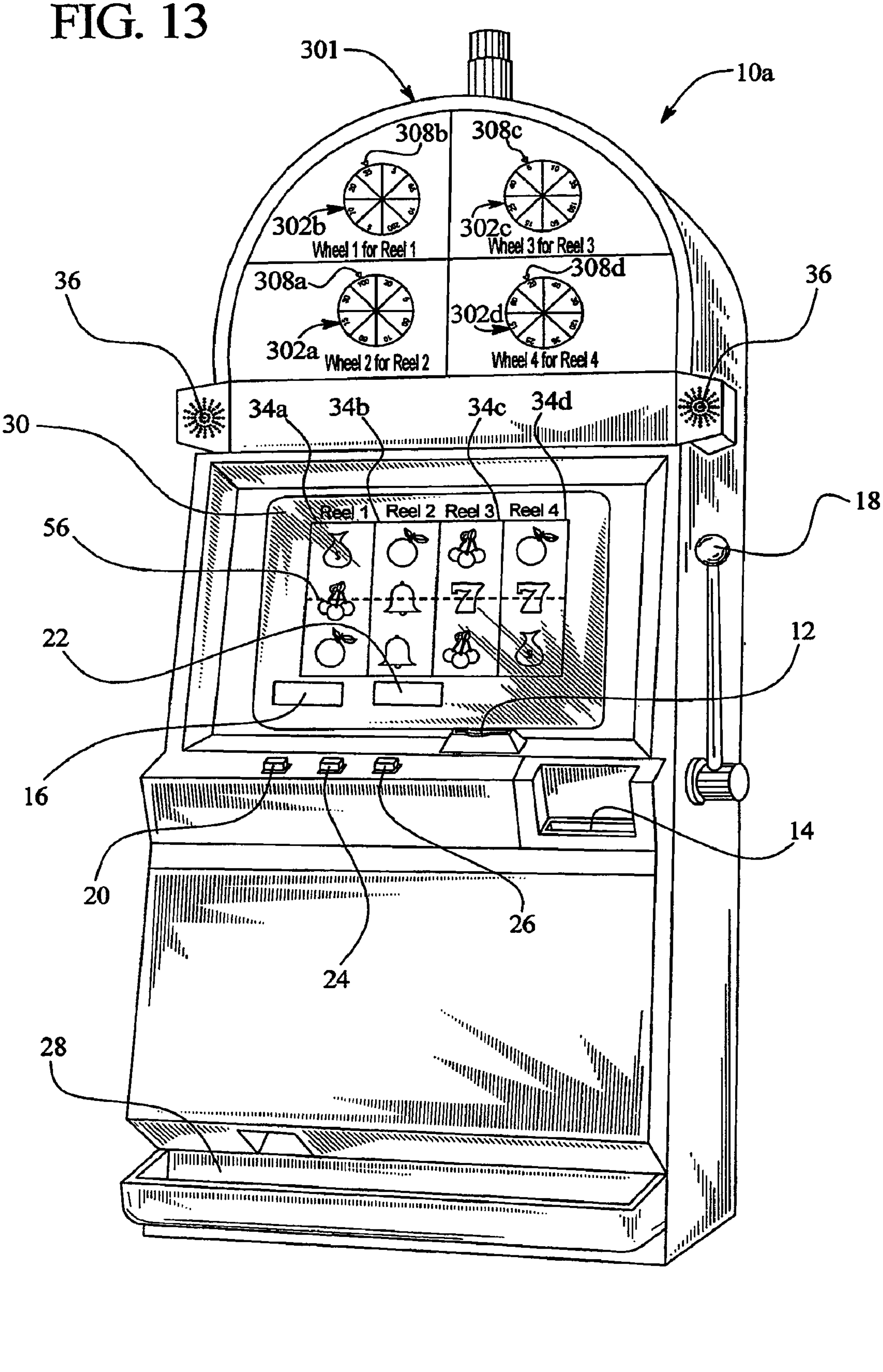
FIG. 13 is a perspective view of another alternative embodiment of the gaming device of the present invention illustrating a gaming device including four reels and a wheel associated with each of those reels.

Referring now to FIG. 13, in another alternative embodiment, the gaming device includes a plurality of reels, such as the four reels 34*a*, 34*b*, 34*c* and 34*d*, and a plurality of wheels 302 where each of the wheels is associated with a different reel. In this embodiment, the gaming device includes four wheels, 302*a*, 302*b*, 302*c* and 302*d*, which are associated with reels 34*a*, 34*b*, 34*c* and 34*d*, respectively. Each of the wheels includes a plurality of sections 304 including awards 306. A section indicator 308 is also associated with each of the wheels 302. As described above, one, a plurality or all of the wheels 302 may be activated in each spin of the reels 34 when a predetermined symbol or bonus symbol is indicated on one or more of the reels. For example, if a predetermined symbol or bonus symbol is indicated on the first reel 34*a*, the gaming device activates the first wheel 302*a*. If a predetermined symbol or bonus symbol is indicated on the second reel 34*b*, the gaming device activates the second wheel 302*b*. If a predetermined symbol or bonus symbol is indicated on the third reel 34*c*, the gaming device activates the third wheel 302*c*. If a predetermined symbol or bonus symbol is indicated on the fourth reel 34*d*, the gaming device activates the fourth wheel 302*d*. Therefore, one or more of the wheels may be activated in one or more of the spins in the game.

Figure 14:
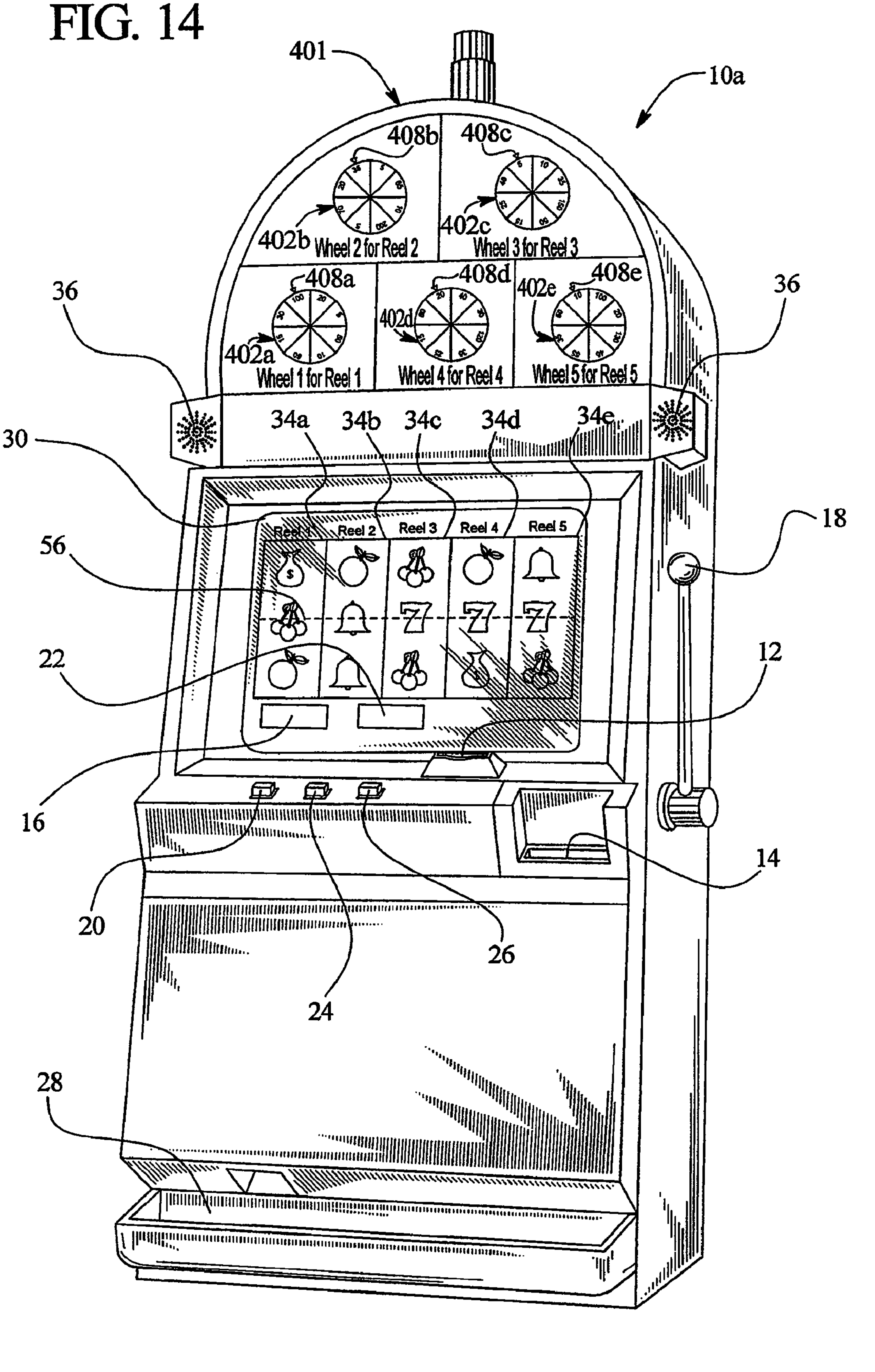
FIG. 14 is a perspective view of a further alternative embodiment of the gaming device of the present invention illustrating a gaming device including five reels and a wheel associated with each of those reels.

Referring now to FIG. 14, in a further alternative embodiment, the gaming device includes five reels 34*a*, 34*b*, 34*c*, 34*d* and 34*e* and a plurality of wheels 402*a*, 402*b*, 402*c*, 402*d* and 402*e*. The wheels 402*a*, 402*b*, 402*c*, 402*d* and 402*e* are independently associated or linked with reels 34*a*, 34*b*, 34*c*, 34*d* and 34*e*, respectively. In this embodiment, the wheels 402 each include a plurality of sections 404 having a plurality of awards 406. A section indicator 408 is associated with each of the wheels to indicate an award on the wheels. In a game, one wheel, a plurality of wheels or all of the wheels 402 may be activated when a predetermined symbol or bonus symbol appears or occurs on one or more of the reels 34*a*, 34*b*, 34*c*, 34*d* and 34*e*. It should be appreciated that the reels may be employed in a primary game and the wheels in a bonus game or the reels and wheels may be employed in a primary game and/or a bonus game.

In one embodiment, when a plurality or all of the wheels are activated in a spin, the gaming device simultaneously activates the wheels. In this embodiment, the wheels are each activated at the same time and indicate awards at the same time. For example, if a predetermined symbol is indicated on reels 34*a* and 34*b* in a spin, the gaming device simultaneously activates wheels 402*a* and 402*b* to indicate awards on these wheels.

In another embodiment, the gaming device sequentially activates the wheels in a spin when a plurality or all of the reels are activated in the spin. In this embodiment, the first reel is activated, then the second reel is activated and so on. In one example, if a predetermined symbol is indicated on reels 34*a*, 34*b*, 34*c*, 34*d* and 34*e* in a spin, the gaming device sequentially activates wheels 402*a*, 402*b*, 402*c*, 402*d* and 402*e* in order. Therefore, wheel 402*a* spins and stops to indicate an award. After wheel 402*a* stops, wheel 402*b* spins and stops to indicate an award. Similarly, the remaining reels 402*c*, 402*d* and 402*e* each spin and stop to indicate awards. In another embodiment, the wheels are activated in a random order. For example, wheel 402*c* is activated first, then wheel 402*a*, and so on. It should be appreciated that the reels may be activated in a random order, a predetermined order or in any suitable order.

In a further embodiment, the activation or spinning of the wheels overlap each other when two or more of the wheels are activated in a spin. For example, the first wheel 402*a* is activated first. As the first wheel is slowing down or about to stop spinning, the gaming device activates the second wheel or any other suitable wheel which is associated with a reel indicating a predetermined symbol. The activation or spinning of the wheels therefore overlaps or occurs at the same time for a designated period of time. It should be appreciated that two or more of the wheels may be activated or spinning at the same time. It should also be appreciated that the overlapping of the activation or spinning of the wheels may include any suitable number of the wheels which spin in any suitable order.

In an alternative embodiment, one or more of the wheels are associated with each of the reels. The gaming device activates the wheels associated with the reel that indicates the predetermined symbol in a play of the game. It should be appreciated that one, a plurality or all of the wheels may be associated with one or more of the wheels in a game.

It should be appreciated that any suitable number of reels and wheels may be employed in a game. It should also be appreciated that the wheels may be mechanical wheels, video wheels or any suitable combination of mechanical and video wheels.

Figure 15:
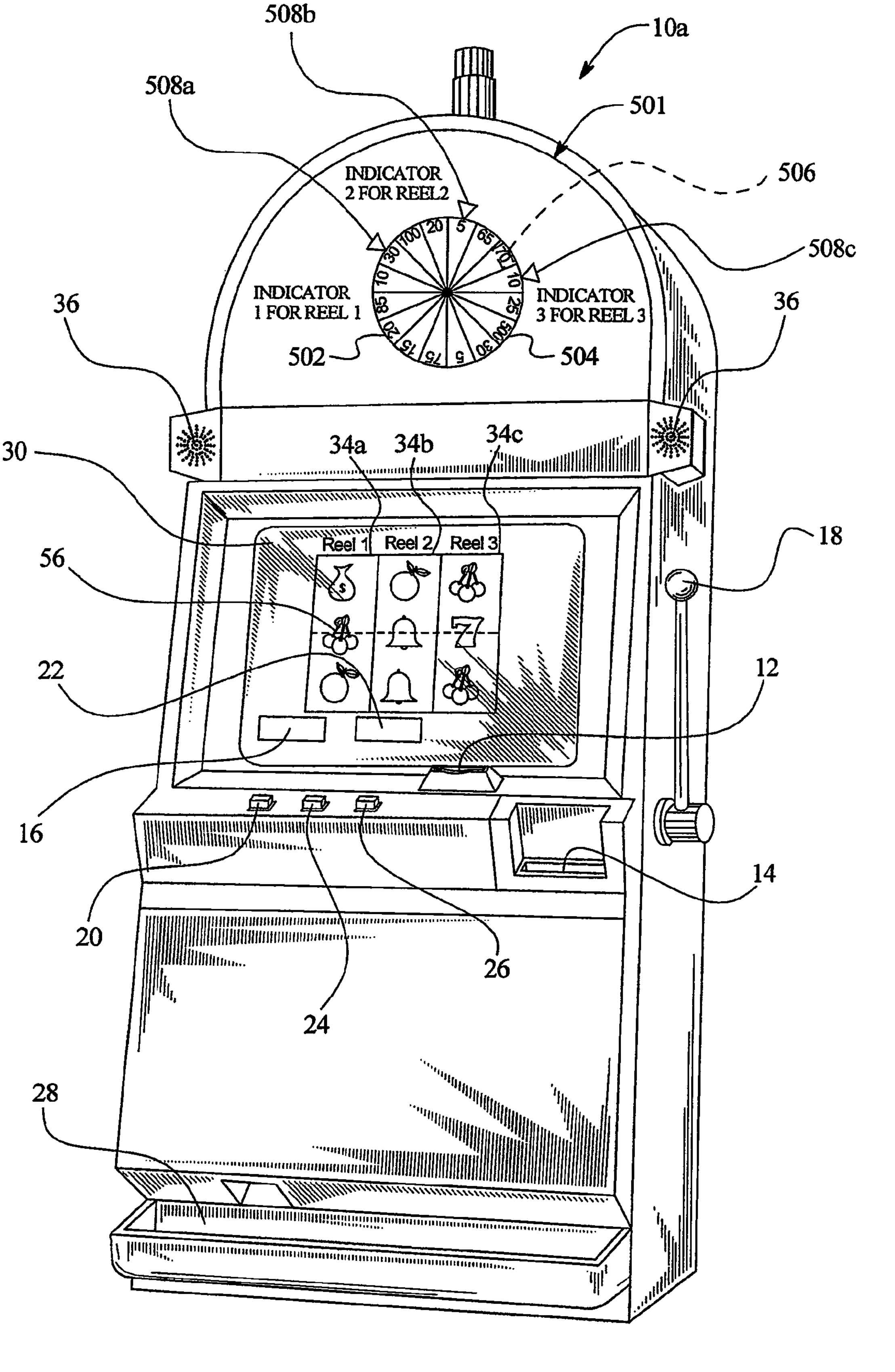
FIG. 15 is a perspective view of another alternative embodiment of the gaming device of the present invention illustrating a gaming device including three reels and a wheel having a plurality of activatable section indicators where each of the activatable section indicators are associated with one of the reels.

Referring now to FIG. 15, another alternative embodiment of the present invention is illustrated where the gaming device includes three reels 34a, 34b and 34c and a shared wheel 502 such as a mechanical or video wheel of display 501. In this embodiment, the wheel 502 is a mechanical wheel including a plurality of sections 504. Each of the sections 504 includes at least one symbol such as an award symbol 506. In this embodiment, a plurality of activatable section indicators 508a, 508b and 508c are positioned adjacent to the wheel 502 and indicate one of the sections 504 on the wheel. Each of the section indicators 508a, 508b and 508c are independently associated or linked with one of the reels 34a, 34b and 34c. For example, section indicator 508a is associated with reel one or reel 34a, section indicator 508b is associated with reel 34b and section indicator 508 is associated with reel 34c.

Each of the section indicators are activatable upon the occurrence of a designated symbol such as a bonus symbol on the reel associated with the section indicator. For example, section indicator 508a is activated when a bonus symbol occurs on reel 34a. Section indicator 508b is activated when a bonus symbol occurs on reel 34b. Section indicator 508c is activated when a bonus symbol occurs on reel 34c. Therefore, each of the section indicators 508a, 508b and 508c are independently activatable upon the occurrence of the designated symbol or bonus symbol on the reel associated with each of the section indicators. After one or more of the section indicators 508a, 508b and 508c are activated in a play of the game, the gaming device of player activates or spins the wheel 502. Each of the section indicators indicate one of the sections 504 on the wheel. The gaming device provides an outcome such as an award associated with the award symbols 506 and the sections 504 indicated by the activated section indicators. The awards associated with the award symbols 506 on the sections indicated by non-activated section indicators are not provided to the player in that play of the game. Accordingly, one or more of the section indicators 508a, 508b and 508c may be activated in a play of the game to provide one or more award to the player in a player of the game.

Figure 16A:
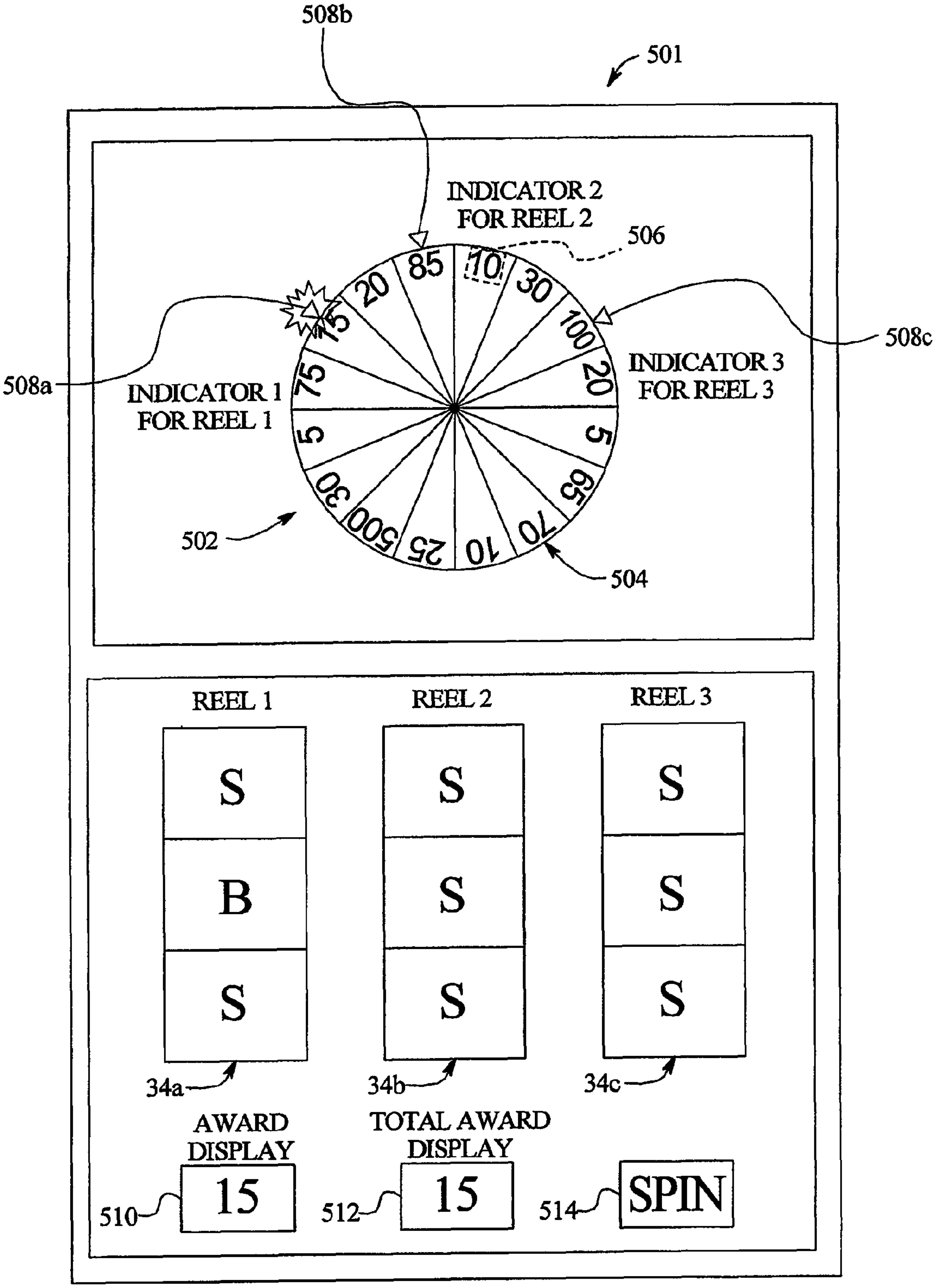
FIG. 16A is a enlarged elevation view of an example of the alternative embodiment of FIG. 15 where one of the section indicators is activated in a play of the game.

Referring now to FIG. 16A, an example of the embodiment of FIG. 15 is illustrated where one of the section indicators is activated in a play of the game. As shown in FIG. 16A, reels 34a, 34b and 34c are activated or spun in a play of the game. Reel one indicates the designated symbol or bonus symbol "B." Therefore, section indicator 508a, which is associated with reel one, is activated in that play of the game. In one embodiment, the player activates wheel 502 by pressing spin button 514. In another embodiment, the gaming device automatically activates the wheel in the play of the game. After the wheel 502 stops spinning, the activated section indicator 508a indicates one of the sections 504 on the wheel. The indicated section provides an award of fifteen. Therefore, the award of fifteen is transferred to the award display 510 and added to the players total award as indicated by the total award display 512. Because reels two and three did not indicate the designated symbol or bonus symbol, the gaming device did not provide the awards associated with the sections indicated by these section indicators.

Figure 16B:
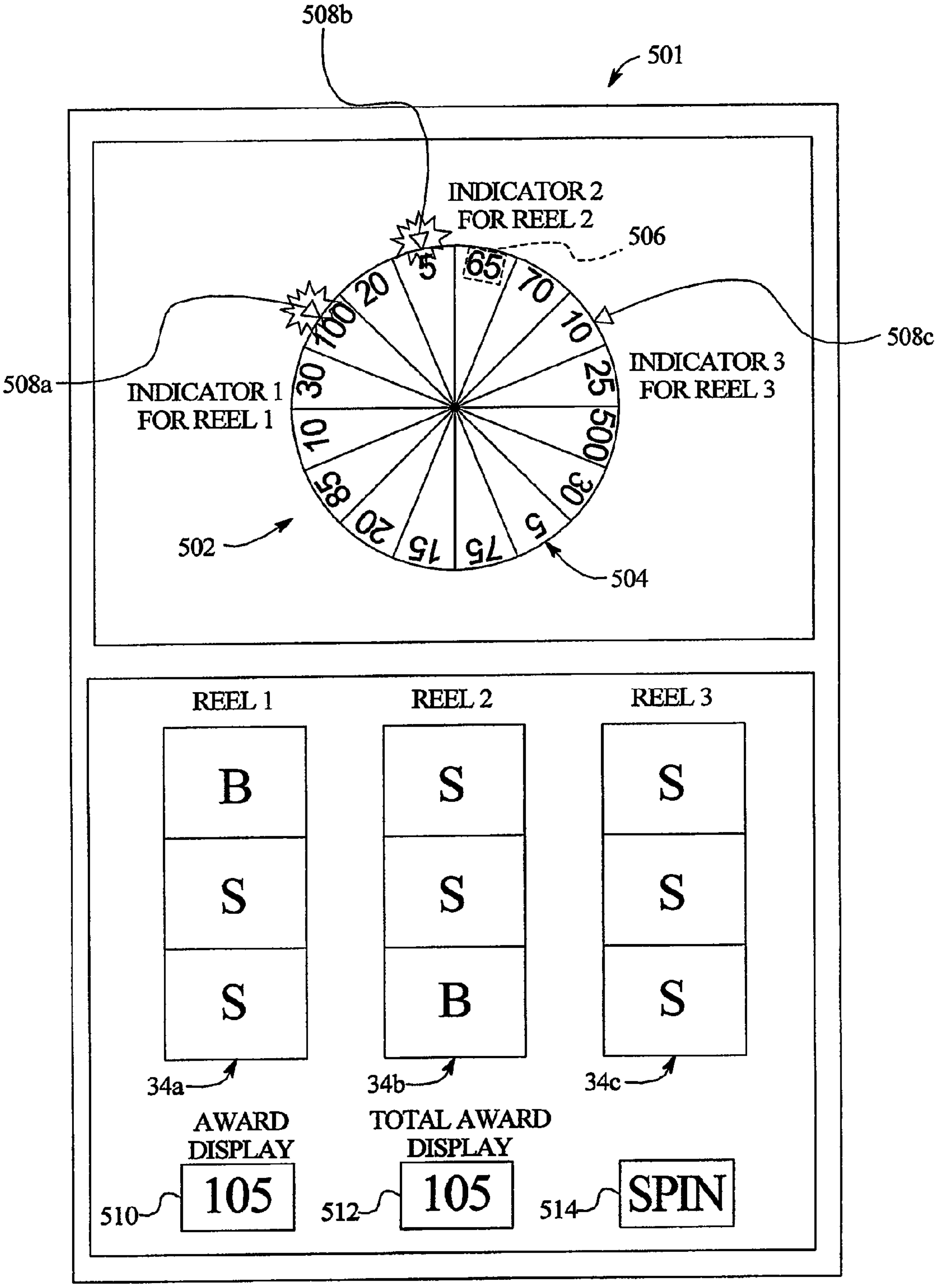
FIG. 16B is a enlarged elevation view of an example of the alternative embodiment of FIG. 15 where two of the section indicators are activated in a play of the game.

Referring now to FIG. 16B, another example of the embodiment of FIG. 15 is illustrated where two of the section indicators are activated in a play of the game. In this example, the gaming device or player activates the reels 34a, 34b and 34c. Reel 34a and reel 34b each indicate the predetermined symbol or bonus symbol "B." Therefore, the gaming device activates section indicators 508a and 508b in this play of the game. The gaming device or player activates or spins the wheel 502. After the wheel stops spinning, activated section indicators 508a and 508b indicate awards of one hundred and five, respectively. Because section indicator 508c was not activated in this play of the game, the award of ten indicated by section indicator 508c is not provided to the player. The total award for this play of the game is one hundred five as indicated by award display 510. The award of one hundred five is added to the players previous total award of zero to give the player a total award of one hundred five as indicated by the total award display 512.

Figure 16C:
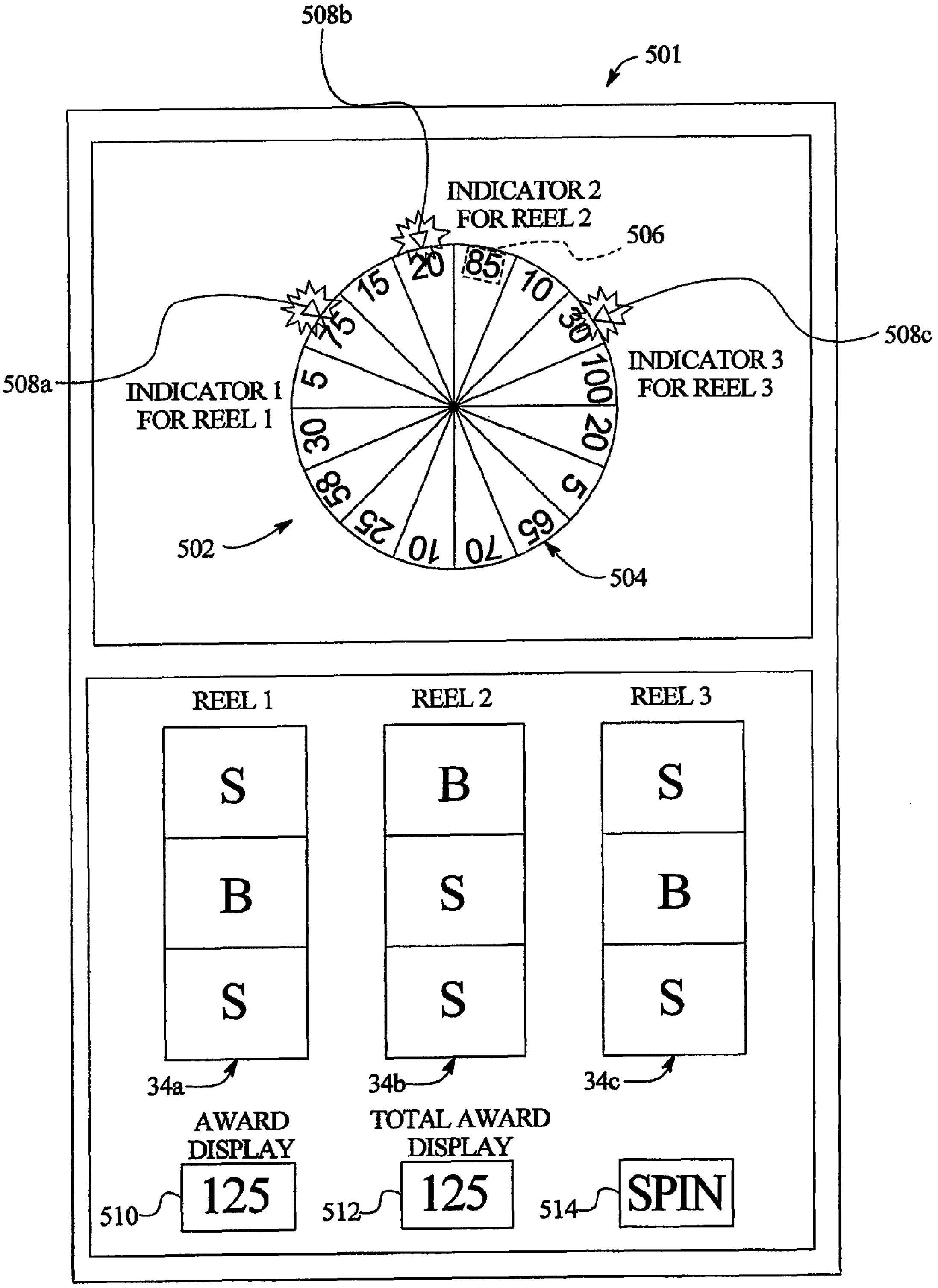
FIG. 16C is a enlarged elevation view of an example of the alternative embodiment of FIG. 15 where all of the section indicators are activated in a play of the game.

Referring now to FIG. 16C, another example of the embodiment of FIG. 15 is illustrated where all of the section indicators are activated in a play of the game. In this example, the gaming device or player activates the reels 34a, 34b and 34c. Each of the reels 34a, 34b and 34c indicate the predetermined symbol or bonus symbol "B." Therefore, section indicators 508a, 508b and 508c are each activated in this play of the game. The gaming device or player then activates the wheel 502. The activated section indicators 508a, 508b and 508c indicate sections 504 having awards of seventy-five, twenty and thirty, respectively. The gaming device sums the indicated awards to provide the player with an award of one hundred twenty-five for this play of the game as indicated by the award display 510. The award of one hundred twenty-five is added to the player's previous total award of zero to give the player a total award of one hundred twenty-five as indicated by the total award display 512.

As described above, the activatable section indicators enable a player to obtain one or more outcomes or awards in a play of the game. Therefore, the players excitement and enjoyment of the game increases because the player has the opportunity to earn several awards and possibly a substantially large award in a play of the game.

In another alternative embodiment, a player's wager determines which of the wheels or section indicators associated with the reels are activatable in a play of the game. For example, as shown in FIG. 15, the gaming device enables the player to wager three credits to activate section indicator 508a when a predetermined symbol occurs on reel 34a. If the predetermined symbol occurs on reels 34b or 34c, section indicators 508b or 508c are not activated. The gaming device enables the player to wager four credits to activate section indicators 508a and 508b when the predetermined symbol occurs on reels 34a, reel 34b or on both reels 34a and 34b. The gaming device enables the player to wager five credits to activate all the reels 34a, 34b and 34c in the play of the game. Thus, the player has the opportunity to activate all of the section indicators 508 in a play of the game and thereby obtain the maximum number of awards available in that play of the game. It should be appreciated that any suitable number of credits or wager amounts may wagered on reels 34a, 34b and 34c. This embodiment enables the player to enhance their opportunities to obtain more awards in a play of the game by placing larger wager amounts to activate one or more of the wheels or section indicators in a play of the game.

In the above embodiment, the player's wager determines the probability of obtaining or indicating one of the predetermined symbols on the reels in a play of the game. In one example, each of the reels includes thirty-two symbols where one of the symbols is a predetermined symbol. Referring to FIG. 15, if the player wager's three credits in a play of the game, the probability of obtaining or indicating the predetermined symbol on reel 34a is ($1/32$) or 3.125%. If the player wager's four credits in the play of the game, the probability of obtaining or indicating the predetermined symbol on reel 34a or reel 34b is [($1/32$)+($1/32$)] or 6.25%. If the player wager's five credits or the maximum number of credits in the play of the game, the probability of obtaining or indicating the predetermined symbol on reel 34a or reel 34b or reel 34c is [($1/32$)+

$(1/32)+(1/32)]$ or 9.375%. It should also be appreciated that any suitable number of credits may be wagered by the player. It should further be appreciated that any suitable probability of obtaining or indicating one or more of the predetermined symbols on the reels may be associated with a number of credits wagered by the player.

In another alternative embodiment, the player's wager determines the average payout provided to the player in the play of the game. In this embodiment, the player wagers a larger wager amount or more credits to increase the average payout provided to the player in the play of the game. For example, the player wagers three credits to obtain an average payout of fifty credits in a play of the game. The player wagers four credits to obtain an average payout of sixty credits in a play of the game. The player wagers five credits or the maximum wager amount to obtain an average payout of seventy credits in a play of the game. It should be appreciated that the average payout may increase or decrease based on the players wager in the play of the game. It should also be appreciated that the average payout may be randomly determined, predetermined or determined according to any suitable determination method. The gaming device therefore changes or modifies the average payout provided to the player in a play of the game based on the wager amount made by the player in that play of the game.

As described above, a players wager can be used to determine the number of wheels or section indicators activated in a play of the game, determine the probability of activating one or more of the wheels or section indicators or determine the average payout provided to the player in a play of the game. It should be appreciated that a player's wager may determine any suitable game function or event associated with a play of the game.

In another embodiment, a plurality of wheels are each independently associated with or linked with a plurality of symbol generators. Each of the wheels includes a plurality of sections, where each section includes an outcome. In this embodiment, the outcome includes a symbol selected from a plurality of symbols. As described above, each wheel is activated when the predetermined symbol is indicated or generated by the symbol generator linked with each of the wheels. A final outcome such as an award is provided to a player based at least in part on any outcomes indicated by the activated wheels in a play of the game. For example, if the predetermined symbol is indicated or generated by each of the symbol generators in a play of the game, the processor activates each of the wheels linked with the symbol generators. Each of the wheels indicate a bar symbol. Therefore, the processor provides the player with a total outcome such as an award based on the three bar symbols. It should be appreciated that any suitable outcomes may be associated with the wheels or provided to the player in a play of the game.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of symbol generators, each symbol generator having a plurality of symbols including a predetermined symbol, (b) display a wheel including a plurality of sections, each of said sections including one of a plurality of outcomes, a plurality of said outcomes being different, (c) display a plurality of section indicators associated with the wheel, each of the plurality of section indicators being independently and respectively linked with a different one of the symbol generators and each symbol generator being independently and respectively linked with a different one of the section indicators, and (d) after displaying the plurality of symbol generators, the wheel and the plurality of section indicators associated with the wheel, for a single play of a game upon a wager by a player:

(i) for each of the symbol generators:

(A) randomly generate at least one of the symbols of said symbol generator, and (B) cause that symbol generator to display said randomly generated symbols, and (ii) if at least one of the predetermined symbols is randomly generated:

(A) cause the wheel to start spinning, (B) cause the wheel to stop spinning at a randomly determined position, said randomly determined position being separate from the random generations of the symbols, (C) for each symbol generator, if said symbol generator randomly generated the predetermined symbol, activate the section indicator independently and respectively linked to that symbol generator, (D) for each activated section indicator, indicate a different one of the sections of the wheel stopped at the randomly determined position, (E) determine an award, said determined award based, at least in part, on each of the outcomes of the indicated sections of the wheel stopped at the randomly determined position, and (F) display and provide any determined award to the player.

2. The gaming device of claim 1, wherein when executed by the at least one processor, the plurality of instructions cause the at least one processor to determine the award based, at least in part, on the wager made by the player.

3. The gaming device of claim 1, wherein the symbol generators are reels.

4. The gaming device of claim 3, wherein the wheel is a mechanical wheel.

5. The gaming device of claim 3, wherein the reels are mechanical reels.

6. The gaming device of claim 5, wherein the wheel is a mechanical wheel.

7. The gaming device of claim 1, wherein the wheel is a mechanical wheel.

8. The gaming device of claim 1, wherein the symbols include a plurality of cards.

9. A method of operating a gaming device, said method comprising:

(a) causing a display of a plurality of symbol generators, each symbol generator having a plurality of symbols including a predetermined symbol, (b) causing a display of a wheel including a plurality of sections, each of said sections including one of a plurality of outcomes, a plurality of said outcomes being different, (c) causing a display a plurality of section indicators associated with the wheel, each of the plurality of section indicators being independently and respectively linked with a different one of the symbol generators and each symbol generator being independently and respectively linked with a different one of the section indicators, and (d) after causing the display of the plurality of symbol generators, the wheel and the plurality of section indicators associated with the wheel, for a single play of a game upon a wager by a player:

(i) for each of the symbol generators:

(A) causing at least one processor to randomly generate at least one of the symbols of said symbol generator, and (B) causing that symbol generator to display said randomly generated symbols, and (ii) if at least one of the predetermined symbols is randomly generated:

(A) causing the at least one processor to cause the wheel to start spinning, (B) causing the at least one processor to cause the wheel to stop spinning at a randomly determined position, said randomly determined position being separate from the random generations of the symbols, (C) for each symbol generator, if said symbol generator randomly generated the predetermined symbol, causing the at least one processor to activate the section indicator independently and respectively linked to that symbol generator, (D) for each activated section indicator, indicating a different one of the sections of the wheel stopped at the randomly determined position, (E) causing the at least one processor to determine an award, said determined award based, at least in part, on each of the outcomes of the indicated sections of the wheel stopped at the randomly determined position, (F) causing at least one display device to display the determined award, and (G) providing the determined award to the player.

10. The method of claim 9, which includes causing the at least one processor to determine the award based, at least in part, on a wager made by the player.

11. The method of claim 9, wherein the symbol generators are reels.

12. The method of claim 11, wherein the wheel is a mechanical wheel.

13. The method of claim 11, wherein the reels are mechanical reels.

14. The method of claim 13, wherein the wheel is a mechanical wheel.

15. The method of claim 9, wherein the wheel is a mechanical wheel.

16. The method of claim 9, wherein the symbols include a plurality of cards.

17. The method of claim 9, which is operated through a data network.

18. The method of claim 17, wherein the data network is an internet.

* * * * *

UNITED STATES PATENT AND TRADEMARK OFFICE

CERTIFICATE OF CORRECTION

PATENT NO. : 7,874,913 B2
APPLICATION NO. : 12/543012
DATED : January 25, 2011
INVENTOR(S) : Webb et al.

It is certified that error appears in the above-identified patent and that said Letters Patent is hereby corrected as shown below:

IN THE CLAIMS:

In Claim 9, column 19, line 5, replace “a display a plurality” with --a display of a plurality--.

Signed and Sealed this
Twenty-sixth Day of April, 2011

David J. Kappos

David J. Kappos
*Director of the United States Patent and Trademark Office*